(12) United States Patent
Zheng

(10) Patent No.: US 10,827,239 B2
(45) Date of Patent: Nov. 3, 2020

(54) MESSAGE TRANSMISSION METHOD, RELAY DEVICE, AND MESSAGE PROCESSOR

(71) Applicant: HUAWEI TECHNOLOGIES CO., LTD., Shenzhen, Guangdong (CN)

(72) Inventor: Ruobin Zheng, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/132,296

(22) Filed: Sep. 14, 2018

(65) Prior Publication Data

US 2019/0037290 A1 Jan. 31, 2019

Related U.S. Application Data

(63) Continuation of application No. PCT/CN2017/073663, filed on Feb. 15, 2017.

(30) Foreign Application Priority Data

Mar. 17, 2016 (CN) .......................... 2016 1 0154669

(51) Int. Cl.
*H04B 10/00* (2013.01)
*H04Q 11/00* (2006.01)
(Continued)

(52) U.S. Cl.
CPC ..... *H04Q 11/0067* (2013.01); *H04L 12/4633* (2013.01); *H04L 12/4641* (2013.01);
(Continued)

(58) Field of Classification Search
CPC .......................... H04Q 11/0067; H04L 45/74
See application file for complete search history.

(56) References Cited

U.S. PATENT DOCUMENTS

2002/0191250 A1* 12/2002 Graves .............. H04Q 11/0066
398/82
2003/0020991 A1* 1/2003 Chang .................. H04B 10/272
398/168
(Continued)

FOREIGN PATENT DOCUMENTS

CN 101014043 A 8/2007
CN 101183977 A 5/2008
(Continued)

OTHER PUBLICATIONS

ITU-T G.988 Amendment 1, Series G: Transmission Systems and Media, Digital Systems and Networks Digital sections and digital line system—Optical line systems for local and access networks, ONU management and control interface (OMCI) specification, Amendment 1: Maintenance. May 2014, 63 pages.

(Continued)

*Primary Examiner* — David C Payne
*Assistant Examiner* — Pranesh K Barua
(74) *Attorney, Agent, or Firm* — Womble Bond Dickinson (US) LLP

(57) ABSTRACT

Embodiments of the present disclosure provide a message transmission method, a relay device, and a message processor, so as to reduce maintenance costs. The method includes: receiving, by a relay device, a downlink message sent by a message processor, where the downlink message includes message content and an address of an ONU; obtaining, by the relay device according to the downlink message, an identifier of the ONU, corresponding to the address of the ONU; and sending, by the relay device, the message content to the ONU according to the identifier of the ONU.

18 Claims, 12 Drawing Sheets

(51) Int. Cl.
*H04L 12/46* (2006.01)
*H04L 12/723* (2013.01)
*H04L 29/12* (2006.01)

(52) U.S. Cl.
CPC .......... *H04L 45/50* (2013.01); *H04L 61/6022* (2013.01); *H04Q 2011/0064* (2013.01); *H04Q 2011/0079* (2013.01)

(56) References Cited

U.S. PATENT DOCUMENTS

| | | | | |
|---|---|---|---|---|
| 2004/0081203 | A1* | 4/2004 | Sodder | H04L 45/04 370/469 |
| 2005/0243837 | A1* | 11/2005 | Boyd | H04L 45/502 370/395.52 |
| 2007/0171918 | A1* | 7/2007 | Ota | H04L 45/54 370/395.53 |
| 2008/0253769 | A1* | 10/2008 | Liu | H04Q 11/0067 398/58 |
| 2008/0267624 | A1* | 10/2008 | Eguchi | H04Q 11/0067 398/58 |
| 2009/0097861 | A1* | 4/2009 | Ikeda | H04J 3/1694 398/167.5 |
| 2009/0208210 | A1* | 8/2009 | Trojer | H04J 3/1617 398/58 |
| 2009/0254939 | A1* | 10/2009 | Nagashio | H04N 7/173 725/33 |
| 2009/0300160 | A1* | 12/2009 | Wan | H04L 41/0843 709/223 |
| 2011/0085799 | A1* | 4/2011 | Mizutani | H04Q 11/0067 398/37 |
| 2011/0116796 | A1* | 5/2011 | Zheng | H04L 12/4633 398/45 |
| 2012/0121258 | A1* | 5/2012 | Li | H04Q 11/0067 398/37 |
| 2013/0094861 | A1* | 4/2013 | Luo | H04J 14/0241 398/68 |
| 2014/0016926 | A1* | 1/2014 | Soto | H04J 14/0256 398/16 |
| 2014/0112656 | A1* | 4/2014 | Yamashita | H04L 12/44 398/16 |
| 2014/0178067 | A1* | 6/2014 | Cheng | H04B 10/27 398/45 |
| 2014/0307738 | A1* | 10/2014 | Chen | H04L 12/66 370/392 |
| 2014/0365768 | A1* | 12/2014 | Sun | H04L 9/0822 713/163 |
| 2016/0036601 | A1* | 2/2016 | Kusano | H04L 12/6418 370/401 |
| 2016/0050471 | A1* | 2/2016 | Boyd | H04Q 11/0067 398/51 |
| 2017/0006361 | A1* | 1/2017 | Berg | H04L 41/00 |
| 2017/0223438 | A1* | 8/2017 | Detwiler | H04Q 11/00 |
| 2017/0272191 | A1* | 9/2017 | Zhang | H04L 7/0075 |
| 2018/0013625 | A1* | 1/2018 | Gao | H04L 41/0843 |

FOREIGN PATENT DOCUMENTS

| | | |
|---|---|---|
| CN | 101854568 A | 10/2010 |
| CN | 101888324 A | 11/2010 |
| CN | 102149024 A | 8/2011 |
| CN | 101924649 B | 4/2015 |
| CN | 104247349 B | 9/2017 |
| EP | 1909421 A1 | 4/2008 |
| EP | 2802111 A1 | 11/2014 |
| EP | 3128698 A1 | 2/2017 |
| EP | 2458811 B1 | 3/2019 |

OTHER PUBLICATIONS

ITU-T G.988, Series G: Transmission Systems and Media,Digital Systems and Networks Digital sections and digital line system—Optical line systems for local and access networks, ONU management and control interface (OMCI) specification, Oct. 2012, 594 pages.

* cited by examiner

MESSAGE TRANSMISSION METHOD, RELAY DEVICE, AND MESSAGE PROCESSOR

CROSS-REFERENCE TO RELATED APPLICATIONS

This application is a continuation of International Application No. PCT/CN2017/073663, filed on Feb. 15, 2017, which claims priority to Chinese Patent Application No. 201610154669.5, filed on Mar. 17, 2016. The disclosures of the aforementioned applications are hereby incorporated by reference in their entireties.

TECHNICAL FIELD

Embodiments of the present disclosure relate to the field of communications technologies, and in particular, to a message transmission method, a relay device, and a message processor.

BACKGROUND

A passive optical network (PON) includes an optical line terminal (OLT) and an optical network unit (ONU). The OLT is disposed between the ONU and a network side, and the OLT processes a message transferred between the ONU and the network side. By using a gigabit passive optical network (GPON) and a next-generation GPON as an example, an optical network terminal management and control interface (OMCI) message processor disposed on the OLT processes an OMCI message transferred between the ONU and the network side. By using an Ethernet passive optical network (EPON) and a next-generation EPON as an example, an operation, administration and maintenance (OAM) message processor disposed on the OLT processes an OAM message transferred between the ONU and the network side. In this way, a process of processing an OMCI/OAM message by the OLT is relatively complex, and a processing function of the OLT is also relatively complex. Consequently, maintenance costs of the OLT are relatively high.

SUMMARY

Embodiments of the present disclosure provide a message transmission method, a relay device, and a message processor, so as to reduce maintenance costs.

According to a first aspect, a message transmission method is provided, including:

receiving, by a relay device, a downlink message sent by a message processor, where the downlink message includes an address of a first ONU and message content; obtaining, by the relay device according to the downlink message, an identifier of the first ONU, corresponding to the address of the first ONU; and sending, by the relay device, the message content to the first ONU according to the identifier of the first ONU. In the foregoing process, the message processor is disposed outside an OLT. Therefore, the message processor disposed outside the OLT processes an initial message sent by a network side, so that the message processor and the OLT are decoupled, and the message processor and the OLT can be separately maintained. This reduces maintenance costs of the message processor and the OLT.

With reference to the first aspect, in a first feasible implementation of the first aspect, a first correspondence is set in the relay device, and the first correspondence is a correspondence between the address of the first ONU and the identifier of the first ONU. The obtaining, by the relay device according to the downlink message, an identifier of the first ONU, corresponding to the address of the first ONU includes: obtaining, by the relay device, the address of the first ONU from the downlink message; and obtaining, by the relay device, the identifier of the first ONU according to the first correspondence and the address of the first ONU. The first correspondence between the address of the first ONU and the identifier of the first ONU is set, so that the relay device can quickly obtain the identifier of the first ONU, corresponding to the address of the first ONU.

The first ONU is an ONU corresponding to the OLT.

Optionally, the first correspondence may be specifically a correspondence between an identifier of the ONU corresponding to the OLT and an address of the ONU corresponding to the OLT. For example, the OLT is corresponding to the first ONU and a second ONU. The first correspondence includes the correspondence between the address of the first ONU and the identifier of the first ONU, and a correspondence between an address of the second ONU and an identifier of the second ONU.

With reference to the first aspect or the first feasible implementation of the first aspect, in a second feasible implementation of the first aspect, the sending, by the relay device, the message content to the first ONU according to the identifier of the first ONU includes: obtaining, by the relay device, the message content from the downlink message; encapsulating, by the relay device, the message content and the identifier of the first ONU into a PON frame; determining, by the relay device according to a second correspondence and the identifier of the first ONU, a target PON port corresponding to the first ONU, where the second correspondence is between the identifier of the first ONU and the target PON port corresponding to the first ONU; and sending, by the relay device, the PON frame by using the target PON port, so that the first ONU obtains the message content according to the PON frame. In this embodiment, a PON port is disposed on the relay device, the message content sent to the first ONU and the identifier of the first ONU are encapsulated into the PON frame, and the PON frame is sent to the first ONU by using the PON port. Because the target PON port and the first ONU are directly connected by using a fiber, and the relay device does not need to be used for relay, a rate of sending the message content can be increased.

Optionally, at least one PON port is disposed on the relay device, and the second correspondence may be specifically a correspondence between the identifier of the ONU corresponding to the OLT and each PON port disposed on the relay device.

Optionally, the address of the first ONU is a Media Access Control (MAC) address of the first ONU, and the downlink message is an Ethernet frame.

Optionally, the address of the first ONU is an Internet Protocol (IP) address of the first ONU, and the downlink message is an IP data packet.

According to a second aspect, a message transmission method is provided, including: generating or obtaining, by a message processor, message content; obtaining, by the message processor, an address of a first ONU; obtaining, by the message processor, a downlink message according to the message content and the address of the first ONU, where the downlink message includes the message content and the address of the first ONU; and sending, by the message processor, the downlink message to a relay device. In the foregoing process, the message processor is disposed outside an OLT. Therefore, the message processor disposed outside the OLT processes an initial message sent by a network side, so that the message processor and the OLT are decoupled, and the message processor and the OLT can be separately maintained. This reduces maintenance costs of the message processor and the OLT.

Optionally, the address of the first ONU may be a destination address of the downlink message, and the message content may be encapsulated into the downlink message.

Optionally, the message processor sends the downlink message to the relay device, so that the relay device can execute the method provided in the first aspect or any implementation of the first aspect.

With reference to the second aspect, in a first feasible implementation of the second aspect, the address of the first ONU is a MAC address, and the obtaining, by the message processor, a downlink message according to the message content and the address of the first ONU includes: obtaining, by the message processor, an Ethernet frame according to the message content and the MAC address of the first ONU, where the Ethernet frame includes the message content and the MAC address of the first ONU, and a destination MAC address of the Ethernet frame is the MAC address of the first ONU.

Optionally, the message processor encapsulates the message content into the Ethernet frame, and sets the MAC address of the first ONU as the destination MAC address of the Ethernet frame, so that the Ethernet frame includes the message content and the MAC address of the first ONU.

Correspondingly, that the message processor sends the downlink message to the relay device includes: sending, by the message processor, the Ethernet frame to the relay device by using an OpenFlow message or a preset tunnel, where the preset tunnel is a virtual extensible local area network (VXLAN) tunnel or a multi-protocol label switching (MPLS) tunnel. In this feasible implementation, the address of the first ONU and the message content are encapsulated into the Ethernet frame, so that the Ethernet frame can be sent to the relay device by using the preset tunnel, and the relay device can also identify the Ethernet frame.

With reference to the second aspect, in a second feasible implementation of the second aspect, the address of the first ONU is an IP address, and the obtaining, by the message processor, a downlink message according to the message content and the address of the first ONU includes: obtaining, by the message processor, an IP data packet according to the message content and the IP address of the first ONU, where the IP data packet includes the message content and the IP address of the first ONU, and a destination IP address of the IP data packet is the IP address of the first ONU.

Optionally, the message processor encapsulates the message content into the IP data packet, and sets the IP address of the first ONU as the destination IP address of the IP data packet, so that the IP data packet includes the message content and the IP address of the first ONU.

Correspondingly, that the message processor sends the downlink message to the relay device includes: sending, by the message processor, the IP data packet to the relay device by using an OpenFlow message or a preset tunnel, where the preset tunnel is a VXLAN tunnel or an MPLS tunnel. In this feasible implementation, the address of the first ONU and the message content are encapsulated into the IP data packet, so that the IP data packet can be sent to the relay device by using the preset tunnel, and the relay device can also identify the IP data packet.

According to a third aspect, a message transmission method is provided, including:

receiving, by a relay device, an uplink message sent by a second ONU, where the uplink message includes an identifier of the second ONU and message content; obtaining, by the relay device according to the uplink message, an address of the second ONU, corresponding to the identifier of the second ONU; and sending, by the relay device, the address of the second ONU and the message content to a message processor. In the foregoing process, the message processor is disposed outside an OLT. Therefore, the message processor disposed outside the OLT processes an initial message sent by a network side, so that the message processor and the OLT are decoupled, and the message processor and the OLT can be separately maintained. This reduces maintenance costs of the message processor and the OLT.

Optionally, the relay device sends the address of the second ONU and the message content to the message processor, so that the message processor can execute the method provided in the second aspect or any feasible implementation of the second aspect.

With reference to the third aspect, in a first feasible implementation of the third aspect, a correspondence between an address of an ONU corresponding to the OLT and an identifier of the ONU corresponding to the OLT is set in the relay device, and the obtaining, by the relay device according to the uplink message, an address of the second ONU, corresponding to the identifier of the second ONU includes: obtaining, by the relay device, the identifier of the second ONU in the uplink message; and obtaining, by the relay device according to the correspondence and the identifier of the second ONU, the address of the second ONU, corresponding to the identifier of the second ONU. In this feasible implementation, the correspondence between the address of the ONU and the identifier of the ONU is set in the relay device, so that the relay device can quickly obtain the address of the second ONU, corresponding to the identifier of the second ONU.

With reference to the third aspect or the first feasible implementation of the third aspect, in a second feasible implementation of the third aspect, the address of the second ONU is a MAC address of the second ONU, and the sending, by the relay device, the address of the second ONU and the message content to a message processor includes: obtaining, by the relay device, the message content from the uplink message; obtaining, by the relay device, an Ethernet frame according to the message content and the MAC address of the second ONU, where the Ethernet frame includes the message content and the MAC address of the second ONU; and sending, by the relay device, the Ethernet frame to the message processor by using an OpenFlow message or a preset tunnel, where the preset tunnel is a VXLAN tunnel or an MPLS tunnel. In this feasible implementation, the address of the second ONU and the message content are encapsulated into the Ethernet frame, so that the Ethernet frame can be sent to the message processor by using the preset tunnel, and the message processor can also identify the Ethernet frame.

Optionally, a method for obtaining the Ethernet frame by the relay device may include: encapsulating, by the relay device, the message content into the Ethernet frame, and setting the MAC address of the second ONU as a destination MAC address of the Ethernet frame.

With reference to the third aspect or the first feasible implementation of the third aspect, in a third feasible implementation of the third aspect, the address of the second ONU is an IP address of the second ONU, and the sending, by the relay device, the address of the second ONU and the message content to a message processor includes: obtaining, by the relay device, the message content from the uplink message; obtaining, by the relay device, an IP data packet according to the message content and the IP address of the second ONU, where the IP data packet includes the message content and the IP address of the second ONU; and sending, by the relay device, the IP data packet to the message processor by using an OpenFlow message or a preset tunnel, where the preset tunnel is a VXLAN tunnel or an MPLS tunnel. In this feasible implementation, the address of the second ONU and the message content are encapsulated into the IP data packet, so that the IP data packet can be sent to the message processor by using the preset tunnel, and the message processor can also identify the IP data packet.

Optionally, a method for obtaining the IP data packet by the relay device may include: encapsulating, by the relay device, the message content into the IP data packet, and setting the IP address of the second ONU as a destination IP address of the IP data packet.

Optionally, the uplink message is a PON frame.

According to a fourth aspect, a relay device is provided, and the relay device includes:

a receiving module, configured to receive a downlink message sent by a message processor, where the downlink message includes an address of a first ONU and message content;

an obtaining module, configured to obtain, according to the downlink message, an identifier of the first ONU, corresponding to the address of the first ONU; and a sending module, configured to send the message content to the first ONU according to the identifier of the first ONU.

With reference to the fourth aspect, in a first feasible implementation of the fourth aspect, a first correspondence between the address of the first ONU and the identifier of the first ONU is set in the relay device, and the obtaining module is specifically configured to:

obtain the address of the first ONU from the downlink message; and obtain, according to the first correspondence and the address of the first ONU, the identifier of the first ONU, corresponding to the address of the first ONU.

With reference to the first feasible implementation of the fourth aspect, in a second feasible implementation of the fourth aspect, the address of the first ONU is a MAC address of the first ONU, and the downlink message is an Ethernet frame; or the address of the first ONU is an IP address of the first ONU, and the downlink message is an IP data packet.

With reference to the fourth aspect or the first feasible implementation of the fourth aspect, in a third feasible implementation of the fourth aspect, at least one PON port is disposed on the relay device, a second correspondence between the identifier of the first ONU and a target PON port corresponding to the first ONU is set in the relay device, and the sending module is specifically configured to:

obtain the message content from the downlink message;

encapsulate the message content and the identifier of the first ONU into a PON frame;

determine, according to the second correspondence and the identifier of the first ONU, the target PON port corresponding to the first ONU; and send the PON frame by using the target PON port.

Optionally, the relay device sends the PON frame by using the target PON port, so that the first ONU can obtain the message content according to the PON frame.

The relay device provided in this embodiment is configured to execute the technical solution shown in any implementation of the first aspect, and implementation principles and technical effects are similar. Details are not described herein again.

According to a fifth aspect, an embodiment of the present disclosure provides a message processor, and the message processor includes:

a first obtaining module, configured to generate or obtain message content;

a second obtaining module, configured to obtain an address of a first ONU;

an encapsulation module, configured to obtain a downlink message according to the message content and the address of the first ONU, where the downlink message includes the message content and the address of the first ONU; and a sending module, configured to send the downlink message to a relay device.

Optionally, a method for obtaining the downlink message by the encapsulation module in the message processor may include: encapsulating the message content to obtain the downlink message, and setting the address of the first ONU as a destination address of the downlink message.

Optionally, the sending module in the message processor sends the downlink message to the relay device, so that the relay device can execute the method provided in the first aspect or any implementation of the first aspect.

With reference to the fifth aspect, in a first feasible implementation of the fifth aspect, the address of the first ONU is a MAC address;

the encapsulation module is specifically configured to: encapsulate the message content into an Ethernet frame, and set the MAC address of the first ONU as a destination MAC address of the Ethernet frame, so that the Ethernet frame includes the message content and the MAC address of the first ONU; and correspondingly, the sending module is specifically configured to send the Ethernet frame to the relay device by using an OpenFlow message or a preset tunnel, where the preset tunnel is a VXLAN tunnel or an MPLS tunnel.

With reference to the fifth aspect, in a second feasible implementation of the fifth aspect, the address of the first ONU is an IP address;

the encapsulation module is specifically configured to: encapsulate the message content into an IP data packet, and set the IP address of the first ONU as a destination IP address of the IP data packet, so that the IP data packet includes the message content and the IP address of the first ONU; and correspondingly, the sending module is specifically configured to send the IP data packet to the relay device by using an OpenFlow message or a preset tunnel, where the preset tunnel is a VXLAN tunnel or an MPLS tunnel.

The message processor shown in this embodiment of the present disclosure is configured to execute the technical solution shown in any implementation of the second aspect, and implementation principles and technical effects are similar. Details are not described herein again.

According to a sixth aspect, an embodiment of the present disclosure provides a relay device, and the relay device includes:

a receiving module, configured to receive an uplink message sent by a second ONU, where the uplink message includes an identifier of the second ONU and message content;

an obtaining module, configured to obtain, according to the uplink message, an address of the second ONU, corresponding to the identifier of the second ONU; and a sending module, configured to send the address of the second ONU and the message content to a message processor.

Optionally, the sending module in the rely device sends the address of the second ONU and the message content to the message processor, so that the message processor can process the message content according to the address of the second ONU and the message content.

With reference to the sixth aspect, in a first feasible implementation of the sixth aspect, the obtaining module is specifically configured to:

obtain the identifier of the second ONU in the uplink message; and obtain the address of the second ONU according to a correspondence and the identifier of the second ONU, where the correspondence is a correspondence between the identifier of the ONU and the address of the second ONU.

Optionally, the correspondence may be specifically a correspondence between an address of an ONU corresponding to an OLT and an identifier of the ONU corresponding to the OLT. If the OLT is corresponding to a first ONU and the second ONU, the correspondence may include a correspondence between an address of the first ONU and an identifier of the first ONU, and the correspondence between the address of the second ONU and the identifier of the second ONU.

With reference to the sixth aspect or the first feasible implementation of the sixth aspect, in a second feasible implementation of the sixth aspect, the address of the second ONU is a MAC address of the second ONU, and the sending module is specifically configured to:

obtain the message content from the uplink message;

obtain an Ethernet frame according to the message content and the MAC address of the second ONU, where the Ethernet frame includes the message content and the MAC address of the second ONU; and send the Ethernet frame to the message processor by using an OpenFlow message or a preset tunnel, where the preset tunnel is a VXLAN tunnel or an MPLS tunnel.

Optionally, a method for obtaining the Ethernet frame by the sending module in the relay device may include: encapsulating the message content into the Ethernet frame, and setting the MAC address of the second ONU as a destination MAC address of the Ethernet frame.

With reference to the sixth aspect or the first feasible implementation of the sixth aspect, in a third feasible implementation of the sixth aspect, the address of the second ONU is an IP address of the second ONU, and the sending module is specifically configured to:

obtain the message content from the uplink message;

obtain an IP data packet according to the message content and the IP address of the second ONU, where the IP data packet includes the message content and the IP address of the second ONU; and send the IP data packet to the message processor by using an OpenFlow message or a preset tunnel, where the preset tunnel is a VXLAN tunnel or an MPLS tunnel.

Optionally, a method for obtaining the IP data packet by the sending module in the relay device may include: encapsulating the message content into the IP data packet, and setting the IP address of the second ONU as a destination IP address of the IP data packet.

With reference to any one of the sixth aspect, or the first feasible implementation of the sixth aspect to the third feasible implementation of the sixth aspect, in a fourth feasible implementation of the sixth aspect, the uplink message is a PON frame.

The relay device shown in this embodiment of the present disclosure is configured to execute the technical solution shown in any implementation of the third aspect, and implementation principles and technical effects are similar. Details are not described herein again.

According to a seventh aspect, an embodiment of the present disclosure provides a relay device, the relay device includes a processor, a receive port, a transmit port, and a memory configured to store a program, and the processor reads the program in the memory to execute the following operations:

receiving, by using the receive port, a downlink message sent by the message processor, where the downlink message includes an address of a first ONU and message content;

obtaining, according to the downlink message, an identifier of the first ONU, corresponding to the address of the first ONU; and sending the message content to the first ONU according to the identifier of the first ONU by using the transmit port.

With reference to the seventh aspect, in a first feasible implementation of the seventh aspect, a first correspondence between the address of the first ONU and the identifier of the first ONU is set in the memory, and the processor is specifically configured to:

obtain the address of the first ONU from the downlink message; and obtain, according to the first correspondence and the address of the first ONU, the identifier of the first ONU, corresponding to the address of the first ONU.

With reference to the first feasible implementation of the seventh aspect, in a second feasible implementation of the seventh aspect, the address of the first ONU is a MAC address of the first ONU, and the downlink message is an Ethernet frame; or the address of the first ONU is an IP address of the first ONU, and the downlink message is an IP data packet.

With reference to the seventh aspect, or the first feasible implementation of the seventh aspect, or the second feasible implementation of the seventh aspect, in a third feasible implementation of the seventh aspect, the transmit port includes at least one PON port, a second correspondence between the identifier of the first ONU and a target PON port corresponding to the first ONU is set in the memory, and the processor is specifically configured to:

obtain the message content from the downlink message;

encapsulate the message content and the identifier of the first ONU into a PON frame;

determine, according to the second correspondence and the identifier of the first ONU, the target PON port corresponding to the first ONU; and send the PON frame by using the target PON port.

Optionally, the transmit port is the target PON port.

Optionally, the processor sends the PON frame by using the target PON port, so that the first ONU can obtain the message content according to the PON frame.

The relay device provided in this embodiment is configured to execute the technical solution shown in any implementation of the first aspect, and implementation principles and technical effects are similar. Details are not described herein again.

According to an eighth aspect, an embodiment of the present disclosure provides a message processor, the message processor includes a processor, a transmit port, and a memory configured to store a program, and the processor reads the program in the memory to execute the following operations:

generating or obtaining message content;
obtaining an address of a first ONU;
obtaining a downlink message according to the message content and the address of the first ONU, where the downlink message includes the message content and the address of the first ONU; and
sending the downlink message to a relay device by using the transmit port.

Optionally, a method for obtaining the downlink message by the processor may include: encapsulating the message content to obtain the downlink message, and setting the address of the first ONU as a destination address of the downlink message.

Optionally, the processor sends the downlink message to the relay device by using the transmit port, so that the relay device can execute the method provided in the first aspect or any implementation of the first aspect.

With reference to the eighth aspect, in a first feasible implementation of the eighth aspect, the address of the first ONU is a MAC address;
the processor encapsulates the message content into an Ethernet frame, and sets the MAC address of the first ONU as a destination MAC address of the Ethernet frame, so that the Ethernet frame includes the message content and the MAC address of the first ONU; and
correspondingly, the processor sends the Ethernet frame to the relay device by using an OpenFlow message or a preset tunnel, where the preset tunnel is a VXLAN tunnel or an MPLS tunnel.

With reference to the eighth aspect, in a second feasible implementation of the eighth aspect, the address of the first ONU is an IP address;
the processor encapsulates the message content into an IP data packet, and sets the IP address of the first ONU as a destination IP address of the IP data packet, so that the IP data packet includes the message content and the IP address of the first ONU; and
the processor sends the IP data packet to the relay device by using an OpenFlow message or a preset tunnel, where the preset tunnel is a VXLAN tunnel or an MPLS tunnel.

The message processor shown in this embodiment of the present disclosure is configured to execute the technical solution shown in any implementation of the second aspect, and implementation principles and technical effects are similar. Details are not described herein again.

According to a ninth aspect, an embodiment of the present disclosure provides a relay device, the relay device includes a processor, a receive port, a transmit port, and a memory configured to store a program, and the processor reads the program in the memory to execute the following operations:
receiving, by using the receive port, an uplink message sent by a second ONU, where the uplink message includes an identifier of the second ONU and message content;
obtaining, according to the uplink message, an address of the second ONU, corresponding to the identifier of the second ONU; and
sending the address of the second ONU and the message content to a message processor by using the transmit port.

Optionally, the processor sends the address of the second ONU and the message content to the message processor by using the transmit port, so that the message processor can process the message content according to the address of the second ONU and the message content.

With reference to the ninth aspect, in a first feasible implementation of the ninth aspect, the processor is specifically configured to:
obtain the identifier of the ONU in the uplink message; and
obtain the address of the ONU according to a correspondence and the identifier of the ONU, where the correspondence is a correspondence between the identifier of the ONU and the address of the ONU.

Optionally, the correspondence may be specifically a correspondence between an address of an ONU corresponding to an OLT and an identifier of the ONU corresponding to the OLT. If the OLT is corresponding to the first ONU and the second ONU, the correspondence may include a correspondence between an address of the first ONU and an identifier of the first ONU, and the correspondence between the address of the second ONU and the identifier of the second ONU.

With reference to the ninth aspect or the first feasible implementation of the ninth aspect, in a second feasible implementation of the ninth aspect, the address of the second ONU is a MAC address of the second ONU, and the processor is specifically configured to:
obtain the message content from the uplink message;
obtain an Ethernet frame according to the message content and the MAC address of the second ONU, where the Ethernet frame includes the message content and the MAC address of the second ONU; and
send the Ethernet frame to the message processor by using an OpenFlow message or a preset tunnel, where the preset tunnel is a VXLAN tunnel or an MPLS tunnel.

Optionally, a method for obtaining the Ethernet frame by the processor may include: encapsulating the message content into the Ethernet frame, and setting the MAC address of the second ONU as a destination MAC address of the Ethernet frame.

With reference to the ninth aspect or the first feasible implementation of the ninth aspect, in a third feasible implementation of the ninth aspect, the address of the second ONU is an IP address of the second ONU, and the processor is specifically configured to:
obtain the message content from the uplink message;
obtain an IP data packet according to the message content and the IP address of the second ONU, where the IP data packet includes the message content and the IP address of the second ONU; and
send the IP data packet to the message processor by using an OpenFlow message or a preset tunnel, where the preset tunnel is a VXLAN tunnel or an MPLS tunnel.

Optionally, a method for obtaining the IP data packet by the processor may include: encapsulating the message content into the IP data packet, and setting the IP address of the second ONU as a destination IP address of the IP data packet.

With reference to any one of the ninth aspect, or the first feasible implementation of the ninth aspect to the third feasible implementation of the ninth aspect, in a fourth feasible implementation of the ninth aspect, the uplink message is a PON frame.

The relay device shown in this embodiment of the present disclosure is configured to execute the technical solution shown in any implementation of the third aspect, and implementation principles and technical effects are similar. Details are not described herein again.

Optionally, the method and the apparatus may be applied to a PON. The PON includes an OLT, and the message processor and the ONU mentioned in any one of the foregoing aspects, the OLT is disposed between the message processor and the ONU, and the relay device mentioned in any one of the foregoing aspects is disposed inside the OLT.

Optionally, the PON is a GPON or a next-generation GPON, the message processor is an OMCI message processor, and the message content is an OMCI downlink message.

Optionally, the PON is an EPON or a next-generation EPON, the message processor is an OAM message processor, and the message content is an OAM downlink message.

According to the message transmission method, the relay device, and the message processor provided in the embodiments of the present disclosure, the message processor is disposed outside the relay device, and the message processor processes the message content sent to the ONU, so that the message processor and the relay device are decoupled. This reduces maintenance costs of the relay device or the OLT in which the relay device is located.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure.

Figure 1:
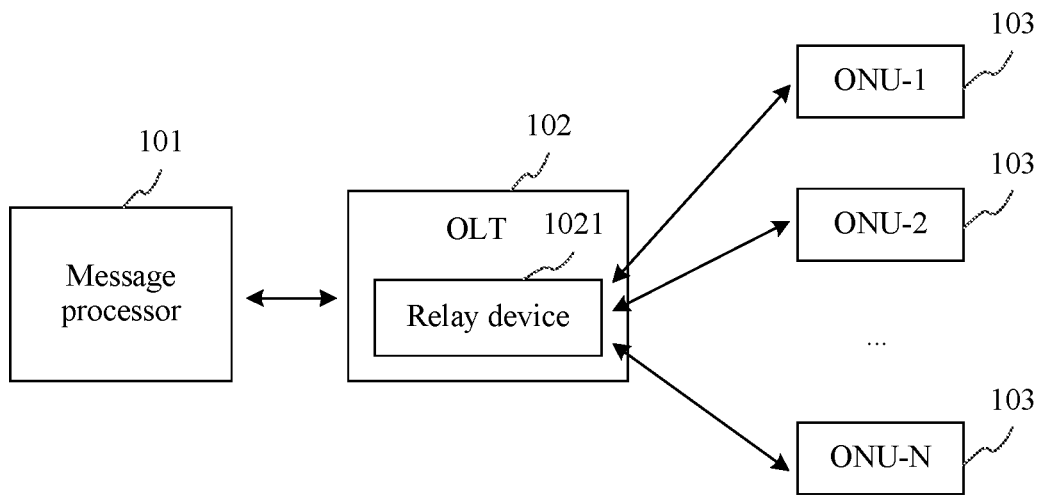
FIG. 1 is a network architecture of a PON according to an embodiment of the present disclosure.

FIG. 1 is a network architecture of a PON according to an embodiment of the present disclosure. Referring to FIG. 1, the PON includes a message processor 101, an OLT 102, and a plurality of ONUs 103. The OLT 102 is disposed between the message processor 101 and the ONUs 103, and a relay device 1021 is disposed inside the OLT 102. In a communication process, the message processor 101 may send OMCI downlink messages or OAM downlink messages to the plurality of ONUs 103, or process OMCI uplink messages or OAM uplink messages sent by the plurality of ONUs 103, so as to control and manage the plurality of ONUs 103. The relay device forwards a message transmitted between the message processor and the ONU.

In this embodiment of the present disclosure, a message transmission process includes an uplink transmission process and a downlink transmission process. A process of sending a message to the ONU by the message processor is the downlink transmission process, and a process of sending a message to the message processor by the ONU is the uplink transmission process. A downlink transmission process of a message is described in detail below by using embodiments shown in FIG. 2 to FIG. 6, and an uplink transmission process of a message is described in detail below by using embodiments shown in FIG. 7 to FIG. 10.

Figure 2:
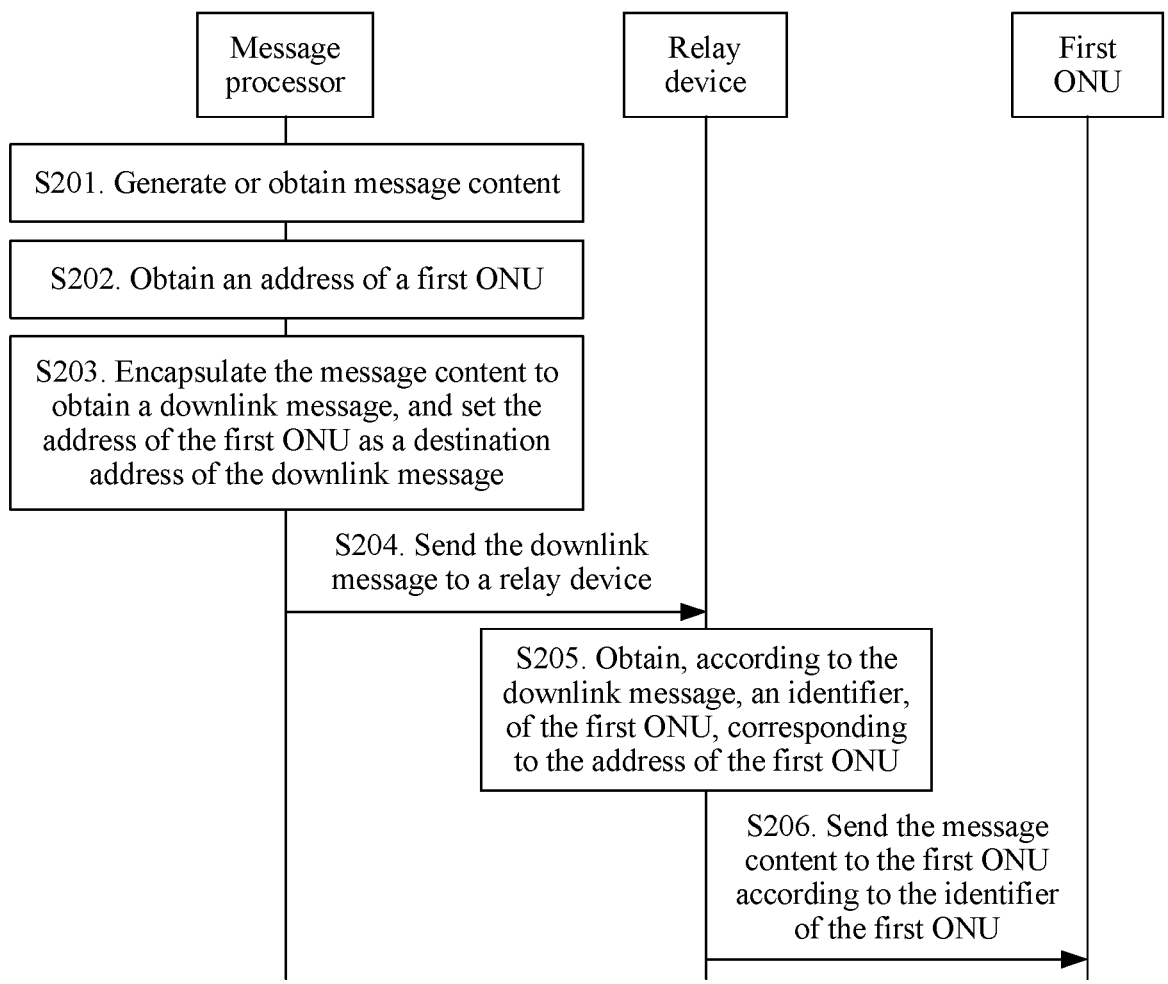
FIG. 2 is a schematic interaction diagram of a downlink transmission method of a message according to an embodiment of the present disclosure.

FIG. 2 is a schematic interaction diagram of a downlink transmission method of a message according to an embodiment of the present disclosure. Referring to FIG. 2, the method may include the following steps:

S201. A message processor generates or obtains message content.

S202. The message processor obtains an address of a first ONU.

S203. The message processor encapsulates the message content to obtain a downlink message, and sets the address of the first ONU as a destination address of the downlink message, so that the downlink message includes the message content and the address of the first ONU.

S204. The message processor sends the downlink message to a relay device.

S205. The relay device obtains, according to the downlink message, an identifier of the first ONU, corresponding to the address of the first ONU.

S206. The relay device sends the message content to the first ONU according to the identifier of the first ONU.

In this embodiment of the present disclosure, a PON may be any one of a GPON, a next-generation GPON, an EPON, or a next-generation EPON. When the PON is the GPON or the next-generation GPON, the message processor is an OMCI message processor, and the message content is an OMCI downlink message. When the PON is the EPON or the next-generation EPON, the message processor is an OAM message processor, and the message content is an OAM downlink message. For ease of description, in this embodiment of the present disclosure, the OMCI message processor and the OAM message processor are collectively referred to as the message processor, and an OMCI message and an OAM message are collectively referred to as the message content.

In this embodiment of the present disclosure, an address of an ONU may be a MAC address of the ONU, an IP address of the ONU, or the like. When the PON is the GPON or the next-generation GPON, an identifier of the ONU may be a number of the ONU. When the PON is the EPON or the next-generation EPON, the identifier of the ONU may be a logic circuit identifier of the ONU. The address of the ONU is in a one-to-one correspondence with the identifier of the ONU.

When the message processor needs to manage and control the first ONU, the message processor generates or obtains the message content used to manage and control the first ONU, and obtains the address of the first ONU. The message processor performs outer encapsulation on the message content to obtain the downlink message, and sets the address of the first ONU as the destination address of the downlink message, so that the downlink message includes the message content and the address of the first ONU. In order that the downlink message can be sent to the relay device, the downlink message and a destination address of the relay device further need to be re-encapsulated, so that a re-encapsulated message can be sent to the relay device.

After the relay device receives the downlink message, the relay device obtains, according to the address of the first ONU in the downlink message, the identifier of the first ONU, corresponding to the address of the first ONU, and sends the message content to the first ONU according to the identifier of the first ONU.

According to the message transmission method provided in this embodiment of the present disclosure, when the message processor needs to control and manage the first ONU, the message processor generates or obtains the message content, obtains the address of the first ONU, and performs outer encapsulation on the message content and the address of the first ONU to obtain the downlink message. The destination address of the downlink message is the address of the first ONU. Then, the message processor sends the downlink message to the relay device. The relay device obtains, according to the received downlink message, the identifier of the first ONU, corresponding to the address of the first ONU, and sends the message content to the first ONU according to the identifier of the first ONU. In the foregoing process, the message processor is disposed outside an OLT. Therefore, the message processor disposed outside the OLT processes the message content sent to the first ONU, so that the message processor and the OLT are decoupled, and the message processor and the OLT can be separately maintained. This reduces maintenance costs of the message processor and the OLT.

On the basis of the embodiment shown in FIG. 2, the message processor may perform, according to the address of the first ONU in the following manners, outer encapsulation on the message content and the address of the first ONU to obtain the downlink message.

In a feasible implementation, the address of the first ONU is a MAC address of the first ONU.

In this feasible implementation, the message processor encapsulates the generated or obtained message content and the obtained MAC address of the first ONU into an Ethernet frame, so that a destination address of the Ethernet frame is the MAC address of the first ONU. Correspondingly, the downlink message is the Ethernet frame.

In another feasible implementation, the address of the first ONU is an IP address of the first ONU.

In this feasible implementation, the message processor encapsulates the generated or obtained message content and the obtained IP address of the first ONU into an IP data packet, so that a destination address of the IP data packet is the IP address of the first ONU. Correspondingly, the downlink message is the IP data packet.

After the message processor encapsulates the address of the first ONU and the message content into the Ethernet frame or the IP data packet in the foregoing two feasible implementations, the message processor sends the Ethernet frame or the IP data packet to the relay device by using an OpenFlow message or a preset tunnel. The preset tunnel is a VXLAN tunnel or an MPLS tunnel.

On the basis of any of the foregoing embodiments, a first correspondence between an address of an ONU corresponding to an OLT and an identifier of the ONU corresponding to the OLT is set in the relay device. After receiving the downlink message sent by the message processor, the relay device may obtain the identifier of the first ONU, corresponding to the address of the first ONU (S205 in the embodiment shown in FIG. 2) in the following feasible implementation: The relay device obtains the address of the first ONU from the downlink message, and obtains, according to the first correspondence and the address of the first ONU, the identifier of the first ONU, corresponding to the address of the first ONU.

In this feasible implementation, one OLT may be corresponding to a plurality of ONUs. An address of an ONU may be a MAC address of the ONU, or may be an IP address of the ONU. An identifier of the ONU may be a number that is set for the ONU, and identifiers of the ONUs corresponding to the OLT are different from each other. For example, assuming that the OLT is corresponding to N ONUs that are denoted as an ONU-1 to an ONU-N, an address of each ONU is corresponding to an identifier of the ONU, and the identifiers of the ONUs are different, the first correspondence stored in the relay device may be shown in Table 1:

TABLE 1

| Address of an ONU | Identifier of the ONU |
|---|---|
| Address of the ONU-1 | Identifier of the ONU-1 |
| Address of the ONU-2 | Identifier of the ONU-2 |
| . . . | . . . |
| Address of the ONU-N | Identifier of the ONU-N |

It should be noted that Table 1 shows only an example of the first correspondence, but is not intended to limit the first correspondence. The first correspondence may be stored in a form of a table, or may be stored in another form. This is not specifically limited in the present disclosure.

On the basis of any of the foregoing embodiments, a plurality of PON ports are disposed on the relay device. A second correspondence between an identifier of an ONU corresponding to an OLT and a PON port is set in the relay device, and the relay device may send the identifier of the ONU and the message content to the first ONU according to the identifier of the first ONU (S205 in the embodiment shown in FIG. 2) in a plurality of feasible implementations. A feasible implementation is described below in an embodiment shown in FIG. 3. For details, refer to the embodiment shown in FIG. 3.

Figure 3:
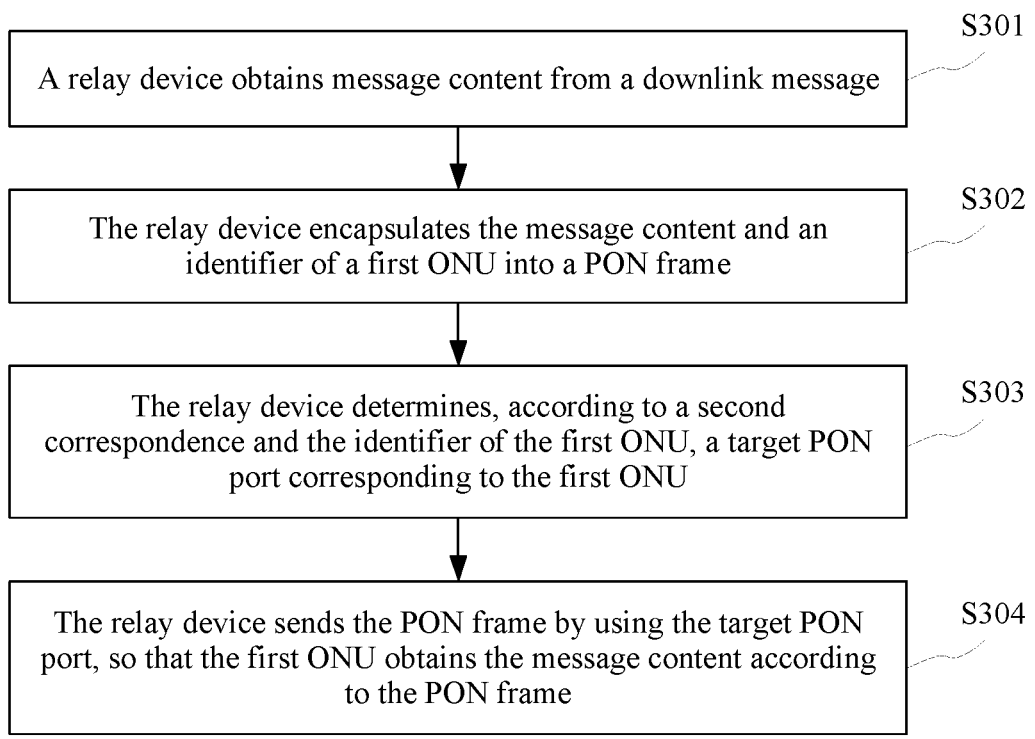
FIG. 3 is a flowchart of sending message content to a first ONU by a relay device according to an embodiment of the present disclosure.

FIG. 3 is a flowchart of sending message content to a first ONU by a relay device according to an embodiment of the present disclosure. The method is executed by the relay device. Referring to FIG. 3, the method may include the following steps:

S301. The relay device obtains message content from a downlink message.

S302. The relay device encapsulates the message content and an identifier of the first ONU into a PON frame.

S303. The relay device determines, according to a second correspondence and the identifier of the first ONU, a target PON port corresponding to the first ONU.

S304. The relay device sends the PON frame by using the target PON port, so that the first ONU obtains the message content according to the PON frame.

In this feasible implementation, each ONU corresponding to an OLT is corresponding to a PON port. For example, assuming that the OLT is corresponding to 100 ONUs that are denoted as an ONU-1 to an ONU-100, and 10 PON ports that are denoted as a PON port 1 to a PON port 10 are disposed on the relay device, the second correspondence stored in the relay device may be shown in Table 2:

TABLE 2

| PON ports | Identifiers of ONUs |
| --- | --- |
| PON port 1 | Identifiers of the ONU-1 to the ONU-10 |
| PON port 2 | Identifiers of the ONU-11 to the ONU-20 |
| ... | ... |
| PON port 10 | Identifiers of the ONU-91 to the ONU-100 |

It should be noted that Table 2 shows only an example of the second correspondence, and is not intended to limit the second correspondence. A correspondence between a PON port and an ONU may be set according to an actual requirement, and a quantity of ONUs corresponding to each PON port may be the same, or may be different. Further, some PON ports may be vacated. For example, 12 PON ports are disposed on the relay device, only 10 PON ports are corresponding to the ONUs, and the other two PON ports are used as standby PON ports, so that the standby PON ports can be enabled when the occupied PON ports are faulty.

Messages sent on a PON port may arrive at all ONUs corresponding to the PON port. For example, the PON port 1 is corresponding to the ONU-1 to the ONU-10, and therefore, messages sent on the PON port 1 may be sent to the ONU-1 to the ONU-10.

In the embodiment shown in FIG. 3, after obtaining the identifier of the first ONU according to the received downlink message, the relay device obtains the message content from the downlink message, and then encapsulates the message content into the PON frame. The relay device determines, according to the second correspondence and the identifier of the first ONU, the target PON port corresponding to the first ONU, and sends the PON frame on the target PON port. The target port may be corresponding to a plurality of ONUs. Therefore, after the relay device sends the PON frame on the target PON port, the plurality of ONUs corresponding to a target PON all receive the PON frame. After the plurality of ONUs receive the PON frame, the ONUs determine whether an identifier of an ONU, included in the PON frame is consistent with ONU identifiers of the ONUs, if the identifier of the ONU, included in the PON frame is consistent with the ONU identifiers of the ONUs, process the received PON frame, and if the identifier of the ONU, included in the PON frame is inconsistent with the ONU identifiers of the ONUs, may discard the received PON frame.

The methods shown in the embodiments in FIG. 2 and FIG. 3 are described in detail below by using a specific example. For details, refer to embodiments shown in FIG. 4 to FIG. 6.

Figure 4:
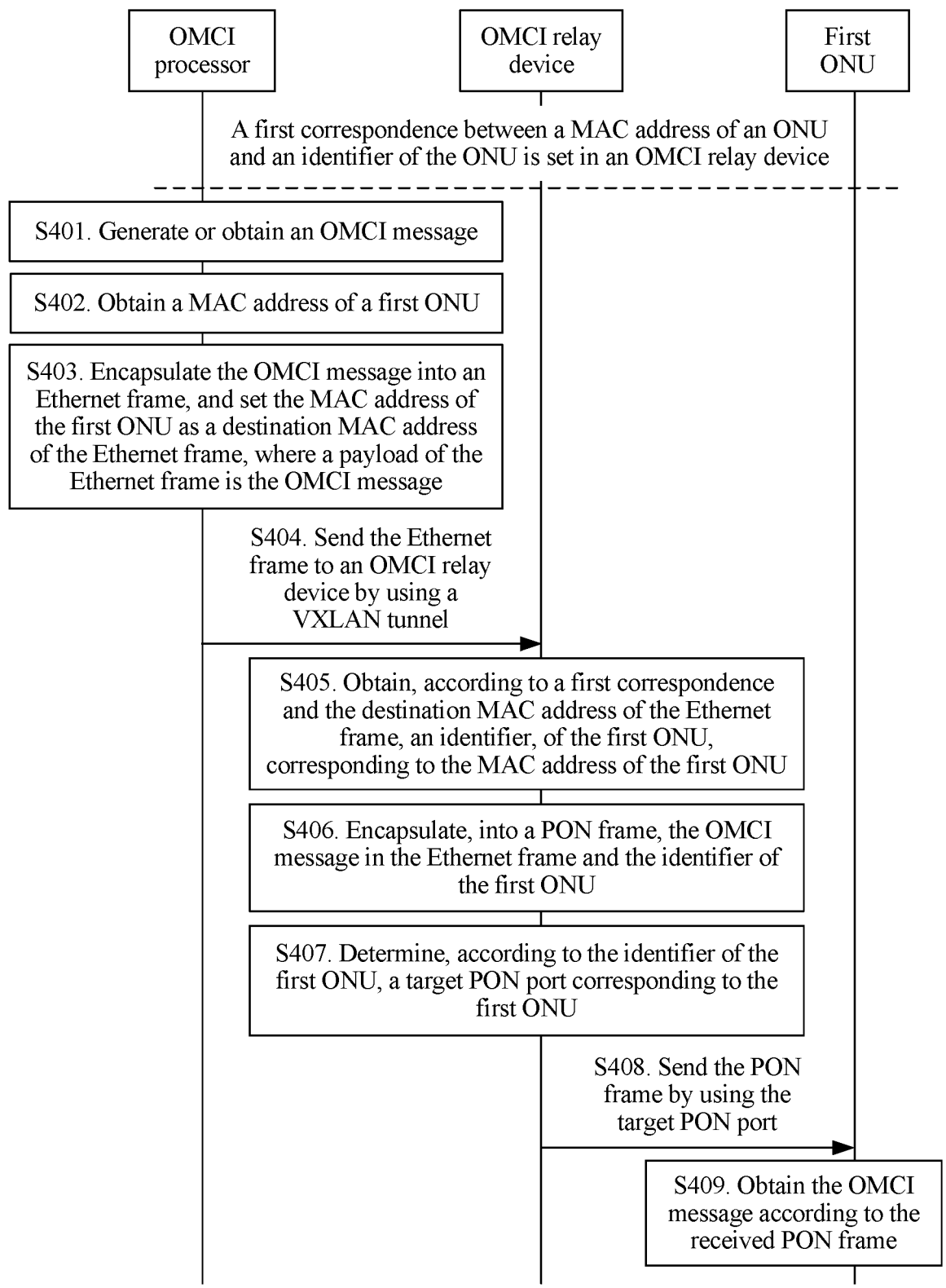
FIG. 4 is a schematic interaction diagram of a downlink transmission method of an OMCI message according to an embodiment of the present disclosure.

FIG. 4 is a schematic interaction diagram of a downlink transmission method of an OMCI message according to an embodiment of the present disclosure. Referring to FIG. 4, the method may include the following steps:

S401. An OMCI message processor generates or obtains an OMCI message.

S402. The OMCI message processor obtains a MAC address of a first ONU.

S403. The OMCI message processor encapsulates the OMCI message into an Ethernet frame, and sets the MAC address of the first ONU as a destination MAC address of the Ethernet frame, where a payload of the Ethernet frame is the OMCI message.

S404. The OMCI message processor sends the Ethernet frame to an OMCI relay device by using a VXLAN tunnel.

S405. The OMCI relay device obtains, according to a first correspondence and the destination MAC address of the Ethernet frame, an identifier of the first ONU, corresponding to the MAC address of the first ONU, where the first correspondence is a correspondence that is between a MAC address of an ONU and an identifier of the ONU and that is set in the OMCI relay device.

S406. The OMCI relay device encapsulates, into a PON frame, the OMCI message in the Ethernet frame and the identifier of the first ONU.

S407. The OMCI relay device determines, according to the identifier of the first ONU, a target PON port corresponding to the first ONU.

S408. The OMCI relay device sends the PON frame by using the target PON port.

S409. The first ONU obtains the OMCI message according to the received PON frame.

In the embodiment shown in FIG. 4, a message processor is the OMCI message processor, message content is the OMCI message, a relay device is the OMCI relay device, and an address of an ONU is the MAC address of the first ONU.

The OMCI message processor generates or obtains the OMCI message, and obtains the address of the first ONU. The OMCI message processor encapsulates the OMCI message into the Ethernet frame, and sets the MAC address of the first ONU as the destination MAC address of the Ethernet frame, so that the Ethernet frame includes the OMCI message and the MAC address of the first ONU. The payload of the Ethernet frame is the OMCI message.

After the OMCI message processor obtains the Ethernet frame, the OMCI message processor may send the Ethernet frame to the OMCI relay device by using the VXLAN tunnel. It should be noted that the OMCI message processor may further send the Ethernet frame to the OMCI relay device by using an MPLS tunnel or an OpenFlow message.

After the OMCI relay device receives the Ethernet frame, the OMCI relay device obtains the destination MAC address of the Ethernet frame (the MAC address of the first ONU), and obtains, according to the MAC address of the first ONU and the first correspondence between the MAC address of the ONU and the identifier of the ONU, the identifier of the first ONU, corresponding to the MAC address of the first ONU. The OMCI relay device removes Ethernet frame encapsulation to obtain the OMCI message, encapsulates the OMCI message into the PON frame, and adds the obtained identifier of the first ONU to the PON frame, so that the PON frame includes the OMCI message and the identifier of the first ONU.

Assuming that the identifier of the first ONU is an ONU-18 shown in Table 2, and the OMCI relay device stores a second correspondence shown in Table 2, the OMCI relay device determines, according to the second correspondence and the identifier of the first ONU (the ONU-18), that the obtained target PON port is a PON port 2. The PON port 2 is corresponding to an ONU-11 to an ONU-20, and the OMCI relay device sends the PON frame on the target PON port (the PON port 2). Correspondingly, the ONU-11 to the ONU-20 all receive the PON frame. After receiving the PON frame, the ONU-11 to the ONU-20 determine whether the identifier of the first ONU (the ONU-18) in the PON frame is consistent with identifiers of the ONU-11 to the ONU-20. If only the ONU-18 determines that the identifier of the first ONU in the PON frame is consistent with an identifier of the ONU-18, the ONU-18 processes the received PON frame, and the ONU-11 to the ONU-17, the ONU-19, and the ONU-20 all discard the received PON frame.

In the embodiment shown in FIG. 4, in a downlink transmission process of the OMCI message, a protocol stack used by the OMCI message processor in a message transmission process is shown in Table 3:

TABLE 3

| OMCI |
| ETH |
| VXLAN |
| UDP |
| IP |
| ETH |

For details, refer to Table 3. Protocols used by the OMCI message processor are successively from a top layer to a bottom layer: the OMCI protocol, the Ethernet protocol, the VXLAN protocol, the User Datagram Protocol (UDP), the IP protocol, and the Ethernet protocol.

A protocol stack used by the OMCI relay device in a message transmission process is shown in Table 4:

TABLE 4

| OMCI |
| GEM |
| PON MAC |
| PON PHY |

For details, refer to Table 4. Protocols used by the OMCI relay device are successively from a top layer to a bottom layer: the OMCI protocol, the GPON encapsulation mode (GEM) protocol, a PON transmission layer protocol (for example, PON MAC), and a PON physical layer protocol (for example, PON PHY).

Figure 5:
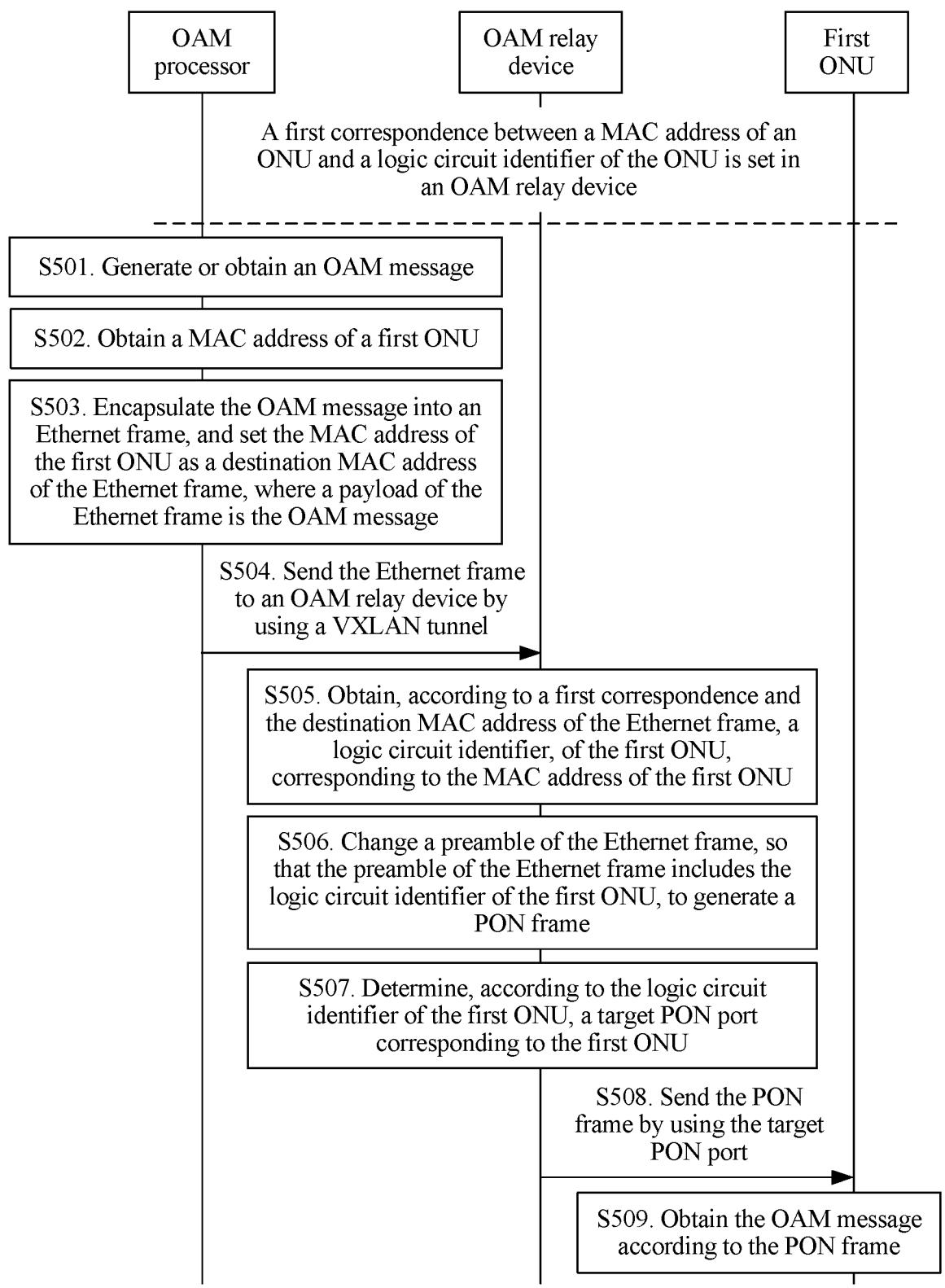
FIG. 5 is a schematic interaction diagram of a downlink transmission method of an OAM message according to an embodiment of the present disclosure.

FIG. 5 is a schematic interaction diagram of a downlink transmission method of an OAM message according to an embodiment of the present disclosure. Referring to FIG. 5, the method may include the following steps:

S501. An OAM message processor generates or obtains an OAM message.

S502. The OAM message processor obtains a MAC address of a first ONU.

S503. The OAM message processor encapsulates the OAM message into an Ethernet frame, and sets the MAC address of the first ONU as a destination MAC address of the Ethernet frame, where a payload of the Ethernet frame is the OAM message.

S504. The OAM message processor sends the Ethernet frame to an OAM relay device by using a VXLAN tunnel.

S505. The OAM relay device obtains, according to a first correspondence and the destination MAC address of the Ethernet frame, a logic circuit identifier of the first ONU, corresponding to the MAC address of the first ONU, where the first correspondence is a correspondence that is between a MAC address of an ONU and a logic circuit identifier of the ONU and that is set in the OAM relay device.

S506. The OAM relay device changes a preamble of the Ethernet frame, so that the preamble of the Ethernet frame includes the logic circuit identifier of the first ONU, to generate a PON frame.

S507. The OAM relay device determines, according to the logic circuit identifier of the first ONU, a target PON port corresponding to the first ONU.

S508. The OAM relay device sends the PON frame by using the target PON port.

S509. The first ONU obtains the OAM message according to the PON frame.

In the embodiment shown in FIG. 5, a message processor is the OAM message processor, message content is the OAM message, a relay device is the OAM relay device, and an address of an ONU is the MAC address of the first ONU.

In the embodiment shown in FIG. 5, in a downlink transmission process of the OAM message, a protocol stack used by the OAM message processor in a message transmission process is shown in Table 5:

TABLE 5

| OAM |
| ETH MAC |
| VXLAN |
| UDP |
| IP |
| ETH |

For details, refer to Table 5. Protocols used by the OAM message processor are successively from a top layer to a bottom layer: the OAM protocol, the Ethernet protocol, the VXLAN protocol, the User Datagram Protocol (UDP), the IP protocol, and the Ethernet protocol.

A protocol stack used by the OAM relay device in a message transmission process is shown in Table 6:

TABLE 6

| OAM |
| EPON MAC |
| PON PHY |

For details, refer to Table 6. Protocols used by the OAM relay device are successively from a top layer to a bottom layer: the OAM protocol, an EPON transmission layer protocol (for example, EPON MAC), and a PON physical layer protocol (for example, PON PHY).

S501 to S504 are similar to S401 to S404, and S507 to S509 are similar to S407 to S409. Details are not described herein again.

In S505 and S506, after the OAM relay device receives the Ethernet frame, the OAM relay device obtains the destination MAC address of the Ethernet frame (the MAC address of the first ONU), and obtains, according to the MAC address of the first ONU and the first correspondence between the MAC address of the ONU and the identifier of the ONU, the logic circuit identifier of the first ONU, corresponding to the MAC address of the first ONU; the OAM relay device changes the preamble of the Ethernet frame, so that the preamble of the Ethernet frame includes the logic circuit identifier of the first ONU, to generate the PON frame.

The downlink transmission method of an OAM message in the embodiment shown in FIG. 5 is similar to the downlink transmission method of an OMCI message in the embodiment shown in FIG. 4. Details are not described herein again.

Figure 6:
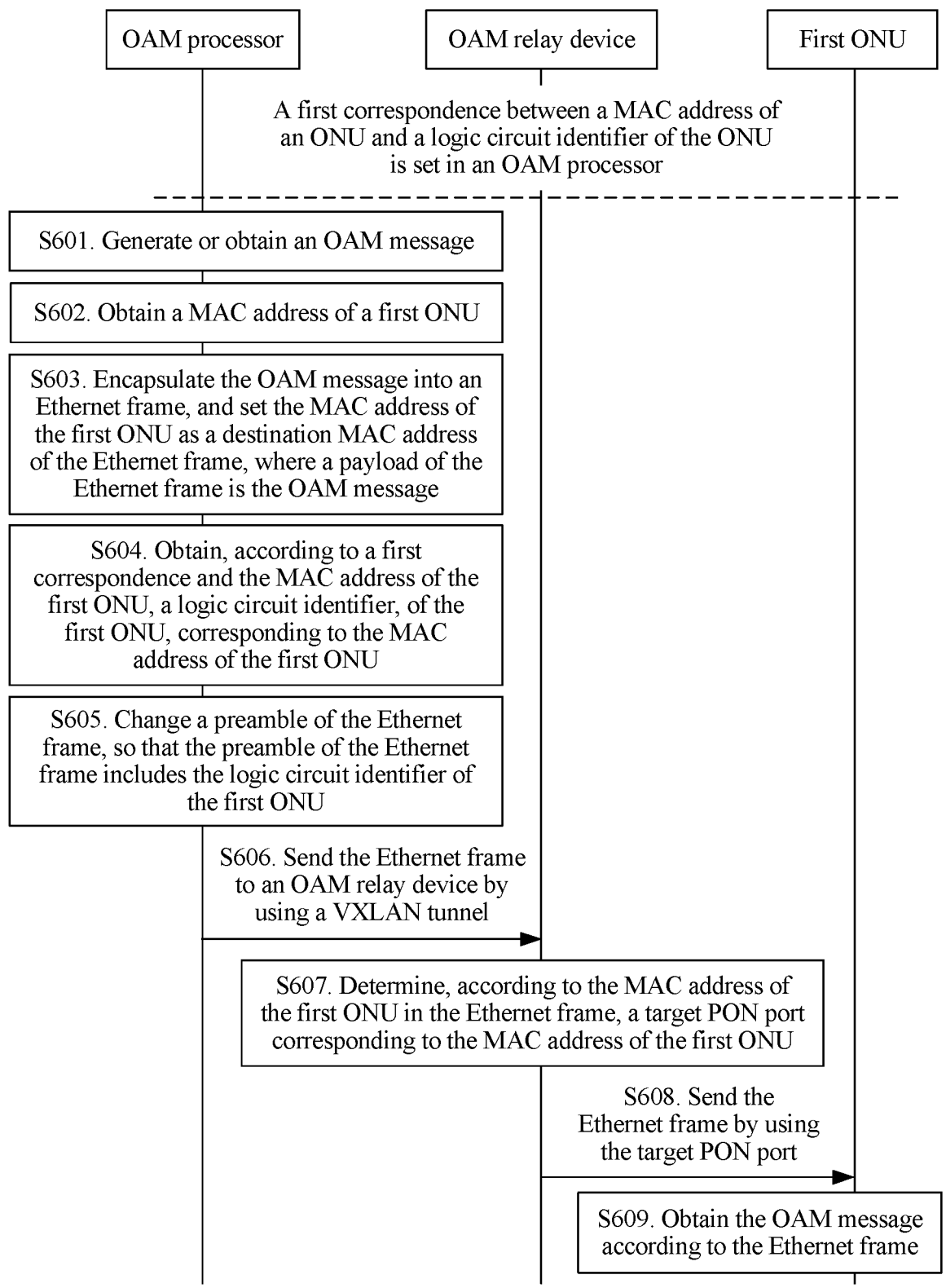
FIG. 6 is a schematic interaction diagram of a downlink transmission method of an OAM message according to an embodiment of the present disclosure.

FIG. 6 is a schematic interaction diagram of a downlink transmission method of an OAM message according to an embodiment of the present disclosure. Referring to FIG. 6, the method may include the following steps:

S601. An OAM message processor generates or obtains an OAM message.

S602. The OAM message processor obtains a MAC address of a first ONU.

S603. The OAM message processor encapsulates the OAM message into an Ethernet frame, and sets the MAC address of the first ONU as a destination MAC address of the Ethernet frame, where a payload of the Ethernet frame is the OAM message.

S604. The OAM message processor obtains, according to a first correspondence and the MAC address of the first ONU, a logic circuit identifier of the first ONU, corresponding to the MAC address of the first ONU, where the first correspondence is a correspondence that is between a MAC address of an ONU and a logic circuit identifier of the ONU and that is set in the OAM message processor.

S605. The OAM message processor changes a preamble of the Ethernet frame, so that the preamble of the Ethernet frame includes the logic circuit identifier of the first ONU.

S606. The OAM message processor sends the Ethernet frame to an OAM relay device by using a VXLAN tunnel.

S607. The OAM relay device determines, according to the MAC address of the first ONU in the Ethernet frame, a target PON port corresponding to the MAC address of the first ONU.

S608. The OAM relay device sends the Ethernet frame by using the target PON port.

S609. The first ONU obtains the OAM message according to the Ethernet frame.

In the embodiment shown in FIG. 6, a message processor is the OAM message processor, message content is the OAM message, a relay device is the OAM relay device, and an address of an ONU is the MAC address of the first ONU.

The OAM message processor generates or obtains the OAM message, obtains the MAC address of the first ONU, encapsulates the OAM message into the Ethernet frame, and sets the MAC address of the first ONU as the destination MAC address of the Ethernet frame. The payload of the Ethernet frame is the OAM message. The OAM message processor obtains, according to the first correspondence, the logic circuit identifier of the first ONU, corresponding to the MAC address of the first ONU, and then changes the preamble of the Ethernet frame, so that the preamble of the Ethernet frame includes the logic circuit identifier of the first ONU. The Ethernet frame with a changed preamble includes the OAM message, the MAC address of the first ONU, and the logic circuit identifier of the first ONU.

After obtaining the Ethernet frame that includes the OAM message, the MAC address of the first ONU, and the logic circuit identifier of the first ONU, the OAM message processor sends the Ethernet frame to the OAM relay device by using the VXLAN tunnel. It should be noted that the OAM message processor may further send the Ethernet frame to the OAM relay device by using an MPLS tunnel or an OpenFlow message.

After the OAM relay device receives the Ethernet frame, the OAM relay device determines, according to the MAC address of the first ONU in the Ethernet frame, the target PON port corresponding to the MAC address of the first ONU, and sends the Ethernet frame by using the target PON port, so that the first ONU obtains the OAM message according to the Ethernet frame.

Figure 7:
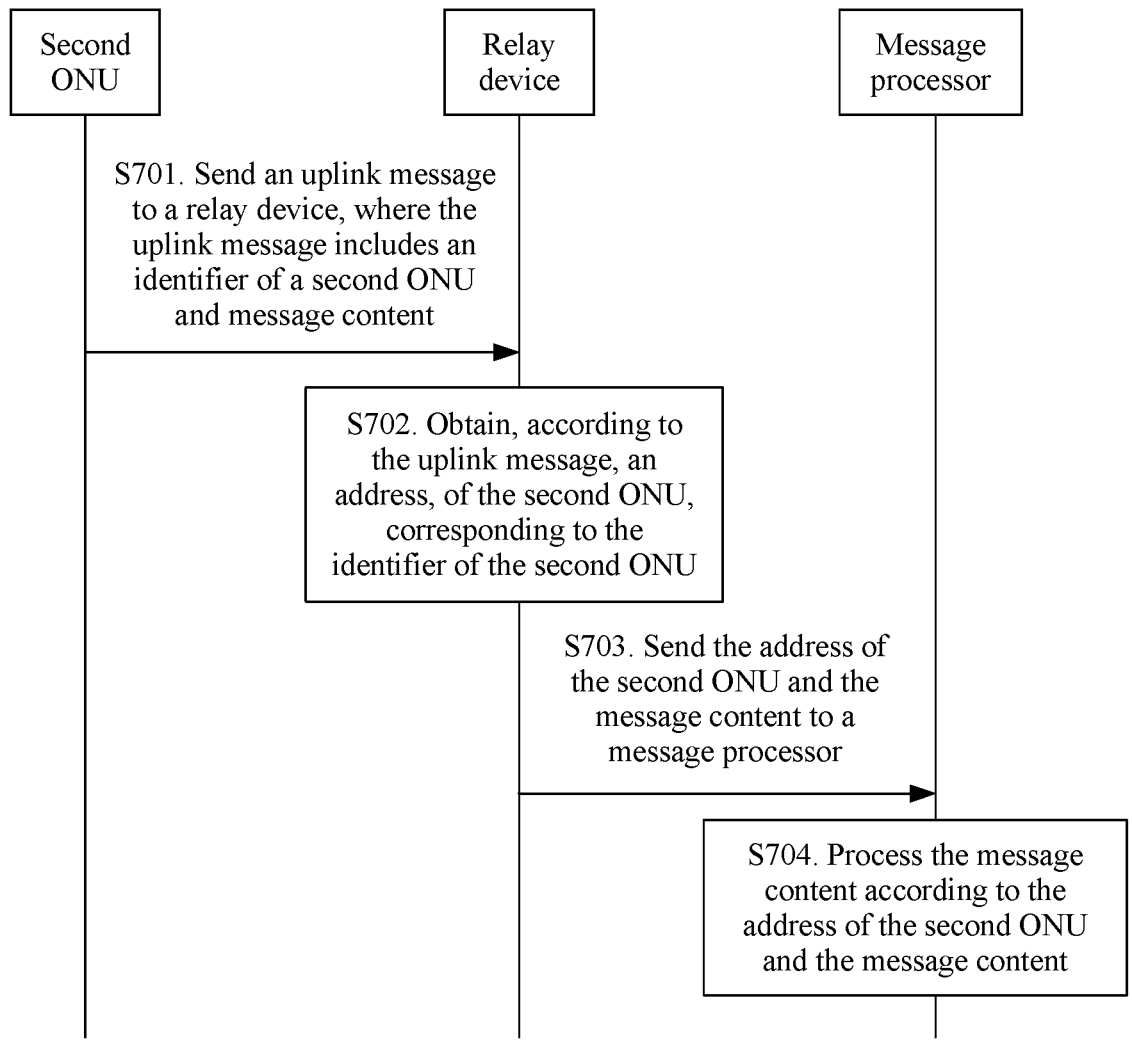
FIG. 7 is a schematic interaction diagram of an uplink transmission method of a message according to an embodiment of the present disclosure.

FIG. 7 is a schematic interaction diagram of an uplink transmission method of a message according to an embodiment of the present disclosure. Referring to FIG. 7, the method may include the following steps:

S701. A second ONU sends an uplink message to a relay device, where the uplink message includes an identifier of the second ONU and message content.

S702. The relay device obtains, according to the uplink message, an address of the second ONU, corresponding to the identifier of the second ONU.

S703. The relay device sends the address of the second ONU and the message content to a message processor.

S704. The message processor processes the message content according to the address of the second ONU and the message content.

In this embodiment of the present disclosure, a PON may be any one of a GPON, a next-generation GPON, an EPON, or a next-generation EPON. When the PON is the GPON or the next-generation GPON, the message processor is an OMCI message processor, and message content in an initial message is an OMCI message. When the PON is the EPON or the next-generation EPON, the message processor is an OAM message processor, and message content in an initial message is an OAM message. For ease of description, in this embodiment of the present disclosure, the OMCI message processor and the OAM message processor are collectively referred to as the message processor, and an OMCI message and an OAM message are collectively referred to as the message content.

When the second ONU needs to send an uplink message to the message processor, the second ONU first sends the uplink message to the relay device. Optionally, the uplink message may be a PON frame, and the uplink message includes the identifier of the second ONU and the message content. The relay device obtains the message content and the identifier of the second ONU from the uplink message, and obtains the address of the second ONU, corresponding to the identifier of the second ONU. Then, the relay device sends the address of the second ONU and the message content to the message processor.

After receiving the address of the second ONU and the message content that are sent by the relay device, the message processor processes the message content according to the address of the second ONU and the message content.

According to the message transmission method provided in this embodiment of the present disclosure, the second ONU sends, to the relay device, the uplink message including the identifier of the second ONU and the message content. The relay device obtains, according to the uplink message, the address of the second ONU, corresponding to the identifier of the second ONU, and sends the address of the second ONU and the message content to the message processor, so that the message processor processes the message content according to the address of the second ONU and the message content. In the foregoing process, the message processor is disposed outside an OLT. Therefore, the message processor disposed outside the OLT processes an initial message sent by a network side, so that the message processor and the OLT are decoupled, and the message processor and the OLT can be separately maintained. This reduces maintenance costs of the message processor and the OLT.

On the basis of the embodiment shown in FIG. 7, a correspondence between an address of an ONU corresponding to an OLT and an identifier of the ONU corresponding to the OLT is set in the relay device. After receiving the uplink message sent by the second ONU, the relay device may obtain the address of the second ONU, corresponding to the identifier of the second ONU (S702 in the embodiment shown in FIG. 7) in the following feasible implementation: The relay device obtains the identifier of the second ONU in the uplink message, and the relay device obtains, according to the correspondence and the identifier of the second ONU, the address of the second ONU, corresponding to the identifier of the second ONU.

It should be noted that the correspondence that is set in the relay device in this embodiment is the same as the first correspondence in the embodiment shown in FIG. 2. Details are not described herein again.

On the basis of any of the foregoing embodiments, the relay device may send the address of the second ONU and the message content to the message processor according to the address of the second ONU in the foregoing manners:

In a feasible implementation, the address of the second ONU is a MAC address of the second ONU.

In this feasible implementation, the relay device encapsulates the message content into an Ethernet frame, and sets the MAC address of the second ONU as a MAC address of the Ethernet frame, so that the Ethernet frame includes the message content and the MAC address of the second ONU. The relay device sends the Ethernet frame to the message processor by using an OpenFlow message or a preset tunnel. The preset tunnel may include a VXLAN tunnel and an MPLS tunnel.

In another feasible implementation, the address of the second ONU is an IP address of the second ONU.

In this feasible implementation, the relay device encapsulates the message content into an IP data packet, and sets the IP address of the second ONU as an IP address of the IP data packet, so that the IP data packet includes the message content and the IP address of the second ONU. The relay device sends the IP data packet to the message processor by using an OpenFlow message or a preset tunnel. The preset tunnel may include a VXLAN tunnel and an MPLS tunnel.

The method shown in the embodiment in FIG. 7 is described in detail below by using a specific example. For details, refer to embodiments shown in FIG. 8 to FIG. 10.

Figure 8:
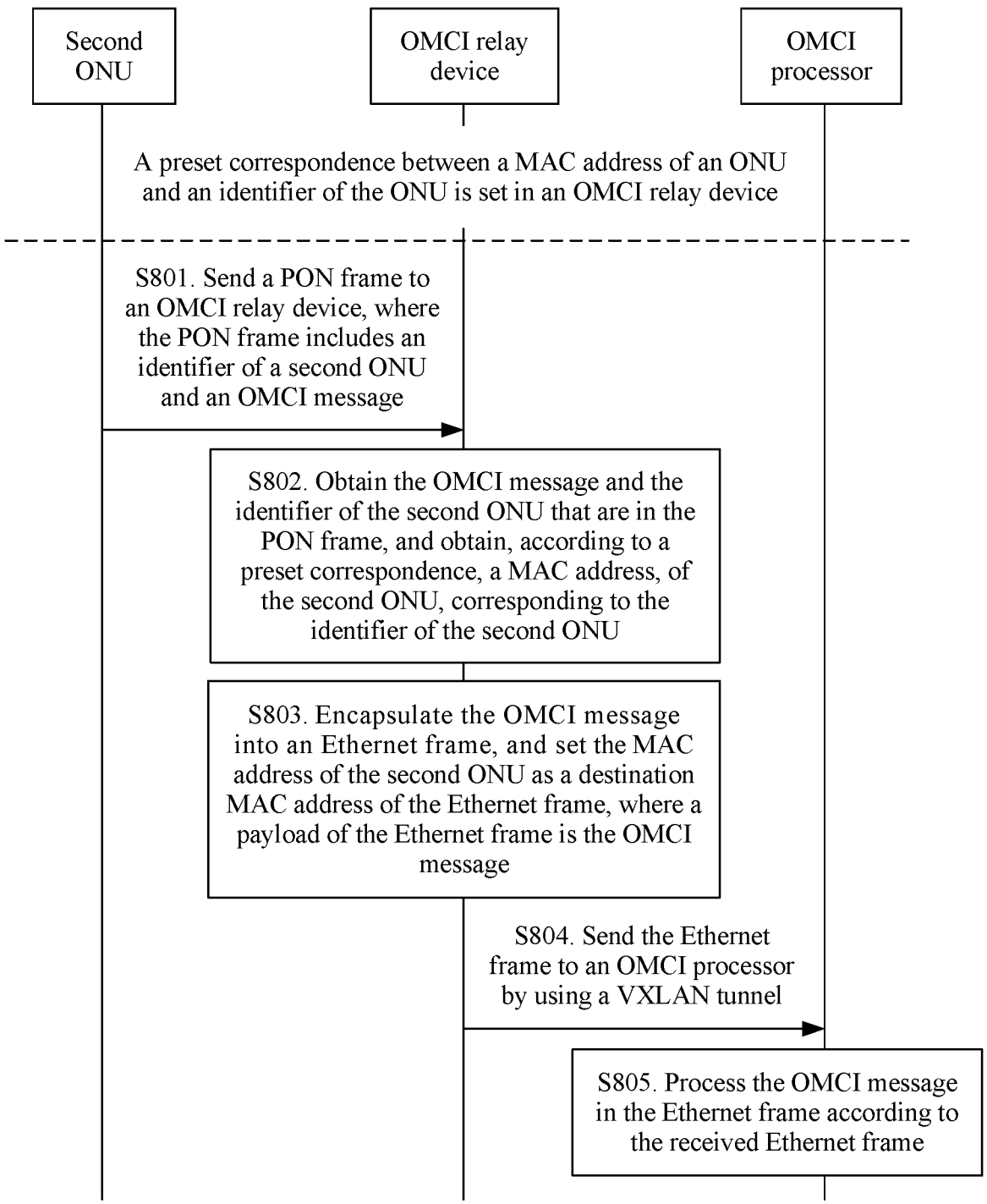
FIG. 8 is a schematic interaction diagram of an uplink transmission method of an OMCI message according to an embodiment of the present disclosure.

FIG. 8 is a schematic interaction diagram of an uplink transmission method of an OMCI message according to an embodiment of the present disclosure. Referring to FIG. 8, the method may include the following steps:

S801. A second ONU sends a PON frame to an OMCI relay device, where the PON frame includes an identifier of the second ONU and an OMCI message.

S802. The OMCI relay device obtains the OMCI message and the identifier of the second ONU that are in the PON frame, and obtains, according to a preset correspondence, a MAC address of the second ONU, corresponding to the identifier of the second ONU, where the preset correspondence is a correspondence that is between a MAC address of an ONU and an identifier of the ONU and that is set in the OMCI relay device.

S803. The OMCI relay device encapsulates the OMCI message into an Ethernet frame, and sets the MAC address of the second ONU as a destination MAC address of the Ethernet frame, where a payload of the Ethernet frame is the OMCI message.

S804. The OMCI relay device sends the Ethernet frame to an OMCI message processor by using a VXLAN tunnel.

S805. The OMCI message processor processes the OMCI message in the Ethernet frame according to the received Ethernet frame.

In the embodiment shown in FIG. 8, a message processor is the OMCI message processor, message content is the OMCI message, a relay device is the OMCI relay device, and an address of an ONU is the MAC address.

When the second ONU needs to send an OMCI message to the OMCI message processor, the second ONU may encapsulate, into a PON frame, the OMCI message that needs to be sent and the identifier of the second ONU, and send the PON frame to the OMCI relay device.

After the OMCI relay device receives the PON frame sent by the second ONU, the OMCI relay device parses the PON frame to obtain the identifier of the second ONU and the OMCI message that are in the PON frame. Because the correspondence between the identifier of the ONU and the MAC address of the ONU is set in the OMCI relay device, the OMCI relay device obtains, according to the correspondence, the MAC address of the second ONU, corresponding to the identifier of the second ONU, encapsulates the OMCI message into the Ethernet frame, and sets the MAC address of the second ONU as the destination MAC address of the Ethernet frame. The payload of the Ethernet frame is the OMCI message. Then, the OMCI relay device sends the Ethernet frame to the OMCI message processor by using the VXLAN tunnel. It should be noted that the OMCI relay device may further send the Ethernet frame to the OMCI message processor by using an MPLS tunnel or an OpenFlow message.

After receiving the Ethernet frame sent by the OMCI relay device, the OMCI message processor parses the Ethernet frame to obtain the OMCI message, and processes the obtained OMCI message.

Figure 9:
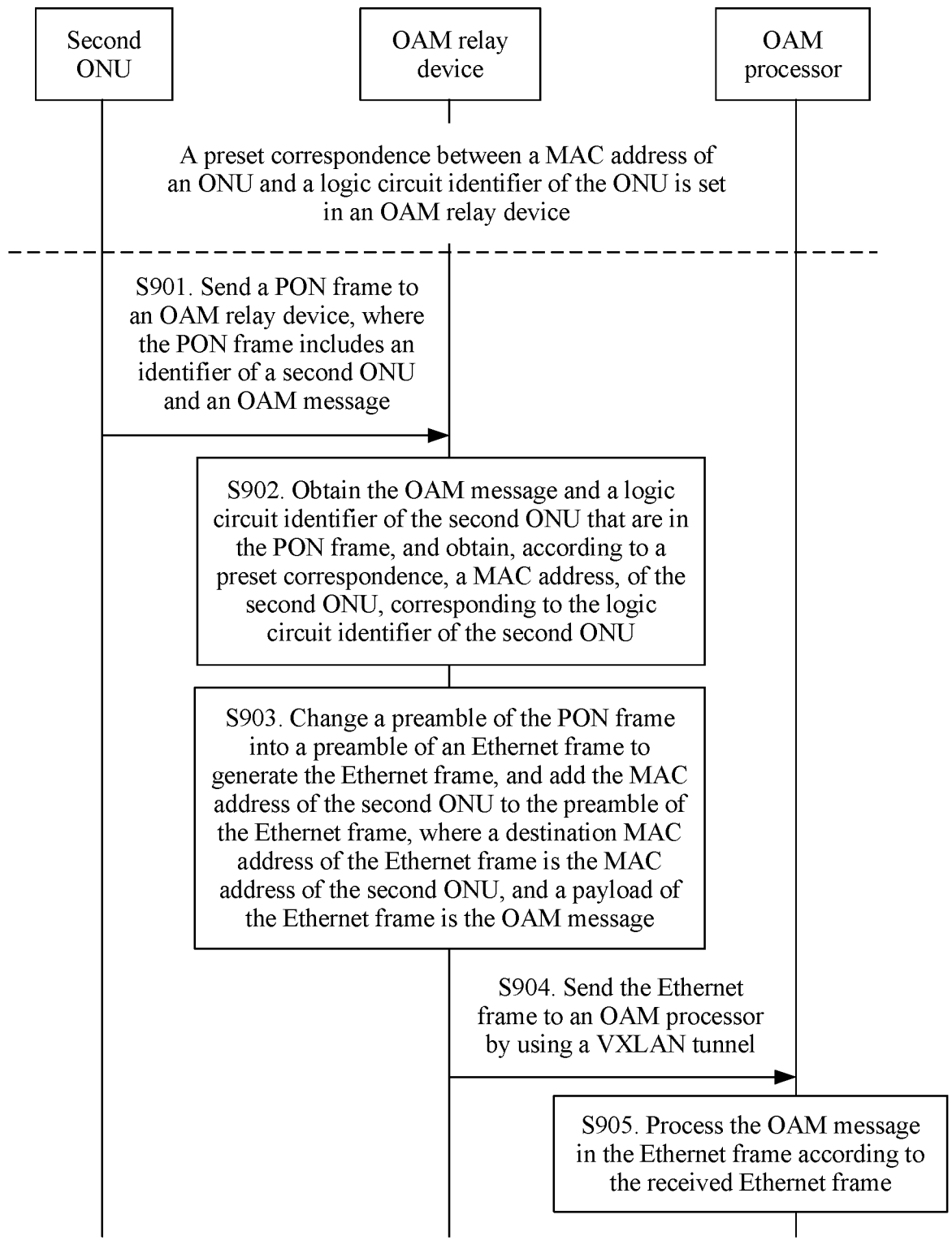
FIG. 9 is a schematic interaction diagram of an uplink transmission method of an OAM message according to an embodiment of the present disclosure.

FIG. 9 is a schematic interaction diagram 1 of an uplink transmission method of an OAM message according to an embodiment of the present disclosure.

Referring to FIG. 9, the method may include the following steps:

S901. A second ONU sends a PON frame to an OAM relay device, where the PON frame includes an identifier of the second ONU and an OAM message.

S902. The OAM relay device obtains the OAM message and a logic circuit identifier of the second ONU that are in the PON frame, and obtains, according to a preset correspondence, a MAC address of the second ONU, corresponding to the logic circuit identifier of the second ONU, where the preset correspondence is a correspondence that is between a MAC address of an ONU and a logic circuit identifier of the ONU and that is set in the OAM relay device.

S903. The OAM relay device changes a preamble of the PON frame into a preamble of an Ethernet frame to generate the Ethernet frame, and adds the MAC address of the second ONU to the preamble of the Ethernet frame, where a destination MAC address of the Ethernet frame is the MAC address of the second ONU, and a payload of the Ethernet frame is the OAM message.

S904. The OAM relay device sends the Ethernet frame to an OAM message processor by using a VXLAN tunnel.

S905. The OAM message processor processes the OAM message in the Ethernet frame according to the received Ethernet frame.

In the embodiment shown in FIG. 9, a message processor is the OAM message processor, message content is the OAM message, a relay device is the OAM relay device, and an address of an ONU is the MAC address.

It should be noted that the uplink transmission method of an OAM message in the embodiment shown in FIG. 9 is similar to the uplink transmission method of an OMCI message in the embodiment shown in FIG. 8. Details are not described herein again.

Figure 10:
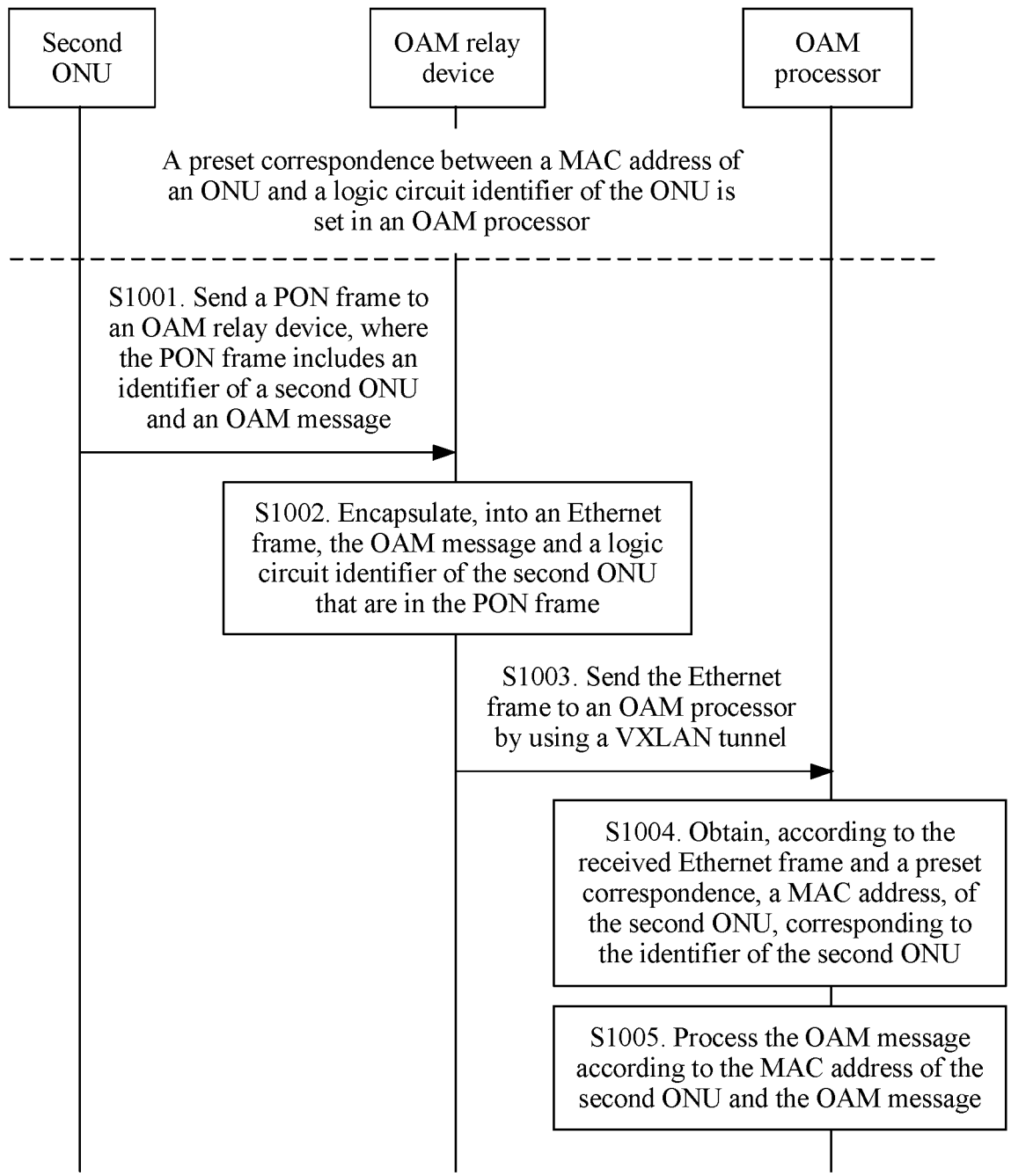
FIG. 10 is a schematic interaction diagram of an uplink transmission method of an OAM message according to an embodiment of the present disclosure.

FIG. 10 is a schematic interaction diagram 2 of an uplink transmission method of an OAM message according to an embodiment of the present disclosure. Referring to FIG. 10, the method may include the following steps:

S1001. A second ONU sends a PON frame to an OAM relay device, where the PON frame includes an identifier of the second ONU and an OAM message.

S1002. The OAM relay device encapsulates, into an Ethernet frame, the OAM message and a logic circuit identifier of the second ONU that are in the PON frame.

S1003. The OAM relay device sends the Ethernet frame to an OAM message processor by using a VXLAN tunnel.

S1004. The OAM message processor obtains, according to the received Ethernet frame and a preset correspondence, a MAC address of the second ONU, corresponding to the identifier of the second ONU, where the preset correspondence is a correspondence that is between a MAC address of an ONU and a logic circuit identifier of the ONU and that is set in the OAM message processor.

S1005. The OAM message processor processes the OAM message according to the MAC address of the second ONU and the OAM message.

In the embodiment shown in FIG. 10, a message processor is the OAM message processor, message content is the OAM message, a relay device is the OAM relay device, and an address of an ONU is the MAC address.

When the second ONU needs to send an OAM message to the OAM processor, the second ONU may encapsulate, into a PON frame, the OAM message that needs to be sent and the identifier of the second ONU, and send the PON frame to the OAM relay device.

After the OAM relay device receives the PON frame sent by the second ONU, the OAM relay device parses the PON frame to obtain the identifier of the second ONU and the OAM message that are in the PON frame, encapsulates the identifier of the second ONU and the OAM message into an Ethernet frame, and sends the Ethernet frame to the OAM message processor.

After the OAM message processor receives the Ethernet frame sent by the OAM relay device, because a correspondence between an identifier of an ONU and a MAC address of the ONU is set in the OAM message processor, the OAM message processor obtains, according to the correspondence, the MAC address of the second ONU, corresponding to the identifier of the second ONU, and processes the OAM message according to the MAC address of the second ONU and the OAM message.

Figure 11:
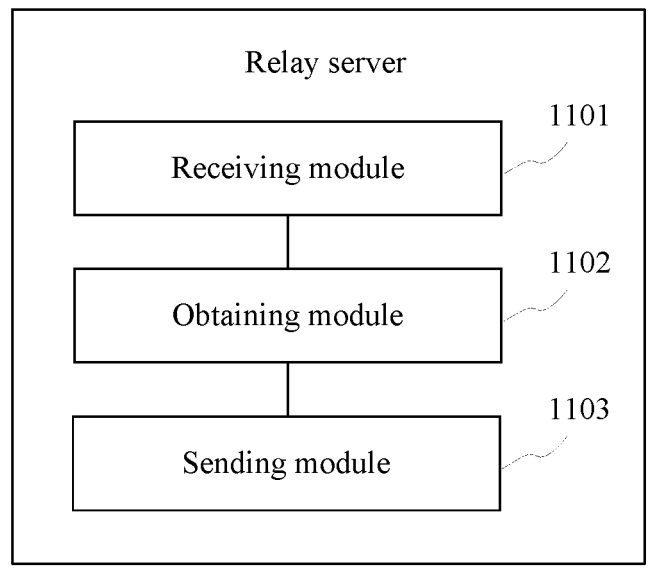
FIG. 11 is a schematic structural diagram of a relay device according to an embodiment of the present disclosure.

FIG. 11 is a schematic structural diagram 1 of a relay device according to an embodiment of the present disclosure. Referring to FIG. 11, the relay device may include:

a receiving module 1101, configured to receive a downlink message sent by a message processor, where the downlink message includes an address of a first ONU and message content;

an obtaining module 1102, configured to obtain, according to the downlink message, an identifier of the first ONU, corresponding to the address of the first ONU;

and a sending module 1103, configured to send the message content to the first ONU according to the identifier of the first ONU.

A first correspondence between an address of an ONU corresponding to an OLT and an identifier of the ONU corresponding to the OLT may be set in the relay device, and correspondingly, the obtaining module 1102 may be specifically configured to:

obtain the address of the first ONU from the downlink message; and obtain, according to the first correspondence and the address of the first ONU, the identifier of the first ONU, corresponding to the address of the first ONU.

Optionally, the address of the first ONU is a MAC address of the first ONU, and the downlink message is an Ethernet frame; or the address of the first ONU is an IP address of the first ONU, and the downlink message is an IP data packet.

At least one PON port is disposed on the relay device, a second correspondence between the identifier of the ONU corresponding to the OLT and each PON port is set in the relay device, and correspondingly, the sending module 1103 may be specifically configured to:

obtain the message content from the downlink message;

encapsulate the message content and the identifier of the first ONU into a PON frame;

determine, according to the second correspondence and the identifier of the first ONU, a target PON port corresponding to the first ONU; and send the PON frame by using the target PON port, so that the first ONU obtains the message content according to the PON frame.

In the embodiment shown in FIG. 11, when a PON is a GPON or a next-generation GPON, the message processor is an OMCI message processor, and the message content is an OMCI downlink message; or when a PON is an EPON or a next-generation EPON, the message processor is an OAM message processor, and the message content is an OAM downlink message.

The relay device shown in this embodiment of the present disclosure may execute the technical solutions shown in the embodiments in FIG. 2 to FIG. 6, and implementation principles and beneficial effects are similar. Details are not described herein again.

Figure 12:
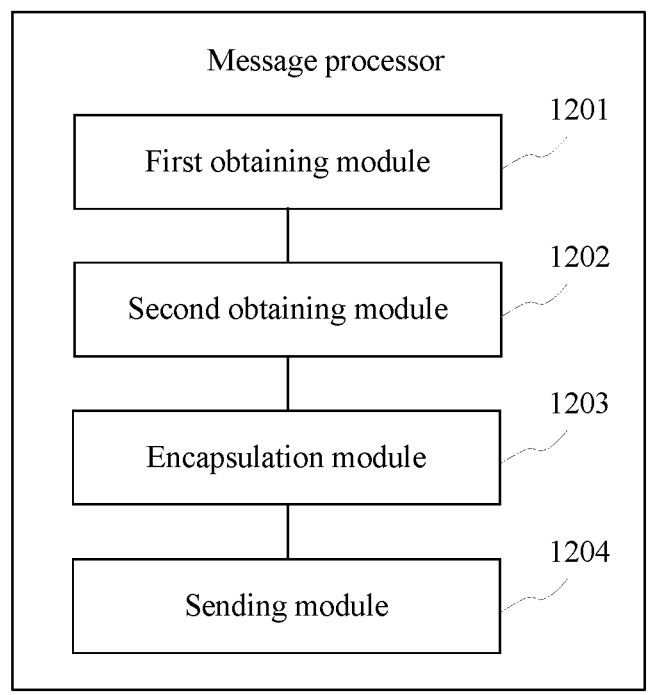
FIG. 12 is a schematic structural diagram of a message processor according to an embodiment of the present disclosure.

FIG. 12 is a schematic structural diagram of a message processor according to an embodiment of the present disclosure. Referring to FIG. 12, the message processor may include:

a first obtaining module 1201, configured to generate or obtain message content;

a second obtaining module 1202, configured to obtain an address of a first ONU;

an encapsulation module 1203, configured to: encapsulate the message content to obtain a downlink message, and set the address of the first ONU as a destination address of the downlink message, so that the downlink message includes the message content and the address of the first ONU; and a sending module 1204, configured to send the downlink message to a relay device, so that the relay device obtains an identifier of the first ONU, corresponding to the address of the first ONU, and sends the identifier of the first ONU and the message content to the first ONU according to the identifier of the first ONU.

When the address of the first ONU is a MAC address, the encapsulation module 1203 may be specifically configured to:

encapsulate the message content into an Ethernet frame, and set the MAC address of the first ONU as a destination MAC address of the Ethernet frame, so that the Ethernet frame includes the message content and the MAC address of the first ONU.

Correspondingly, the sending module 1204 may be specifically configured to:

send the Ethernet frame to the relay device by using an OpenFlow message or a preset tunnel, where the preset tunnel is a VXLAN tunnel or an MPLS tunnel.

When the address of the first ONU is an IP address, the encapsulation module 1203 may be specifically configured to:

encapsulate the message content into an IP data packet, and set the IP address of the first ONU as a destination IP address of the IP data packet, so that the IP data packet includes the message content and the IP address of the first ONU.

Correspondingly, the sending module 1204 may be specifically configured to:

send the IP data packet to the relay device by using an OpenFlow message or a preset tunnel, where the preset tunnel is a VXLAN tunnel or an MPLS tunnel.

In the embodiment shown in FIG. 12, when a PON is a GPON or a next-generation GPON, the message processor is an OMCI message processor, and the message content is an OMCI downlink message; or when a PON is an EPON or a next-generation EPON, the message processor is an OAM message processor, and the message content is an OAM downlink message.

The message processor shown in this embodiment of the present disclosure may execute the technical solutions shown in the embodiments in FIG. 2 to FIG. 6, and implementation principles and beneficial effects are similar. Details are not described herein again.

Figure 13:
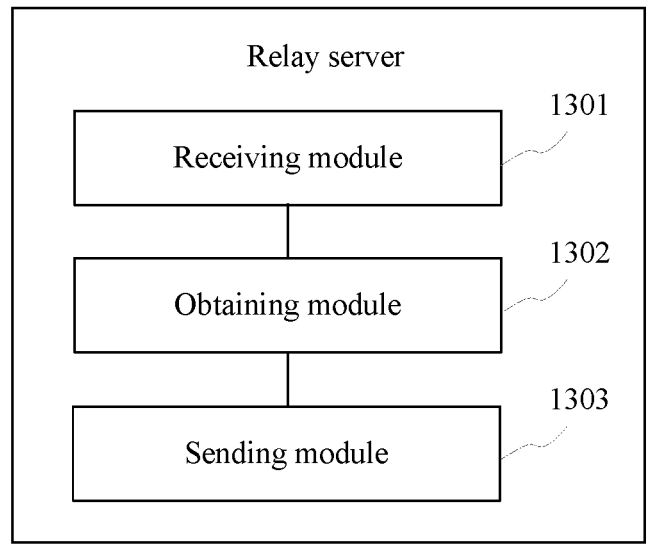
FIG. 13 is a schematic structural diagram of a relay device according to an embodiment of the present disclosure.

FIG. 13 is a schematic structural diagram 2 of a relay device according to an embodiment of the present disclosure. Referring to FIG. 13, the relay device may include:

a receiving module 1301, configured to receive an uplink message sent by a second ONU, where the uplink message includes an identifier of the second ONU and message content;

an obtaining module 1302, configured to obtain, according to the uplink message, an address of the second ONU, corresponding to the identifier of the second ONU; and a sending module 1303, configured to send the address of the second ONU and the message content to a message processor, so that the message processor processes the message content according to the address of the second ONU and the message content.

A correspondence between an address of an ONU corresponding to an OLT and an identifier of the ONU corresponding to the OLT may be set in the relay device, and correspondingly, the obtaining module 1302 may be specifically configured to:

obtain the identifier of the second ONU in the uplink message; and obtain, according to the correspondence and the identifier of the second ONU, the address of the second ONU, corresponding to the identifier of the second ONU.

When the address of the second ONU is a MAC address of the second ONU, the sending module 1303 may be specifically configured to:

obtain the message content from the uplink message;

encapsulate the message content into an Ethernet frame, and set the MAC address of the second ONU as a destination MAC address of the Ethernet frame, so that the Ethernet frame includes the message content and the MAC address of the second ONU; and send the Ethernet frame to the message processor by using an OpenFlow message or a preset tunnel, where the preset tunnel is a VXLAN tunnel or an MPLS tunnel.

When the address of the second ONU is an IP address of the second ONU, the sending module 1303 may be specifically configured to:

obtain the message content from the uplink message;

encapsulate the message content into an IP data packet, and set the IP address of the second ONU as a destination IP address of the IP data packet, so that the IP data packet includes the message content and the IP address of the second ONU; and send the IP data packet to the message processor by using an OpenFlow message or a preset tunnel, where the preset tunnel is a VXLAN tunnel or an MPLS tunnel.

Optionally, the uplink message may be a PON frame.

The relay device shown in this embodiment of the present disclosure may execute the technical solutions shown in the embodiments in FIG. 7 to FIG. 10, and implementation principles and beneficial effects are similar. Details are not described herein again.

It should be noted that the relay device shown in the embodiment in FIG. 11 and the relay device shown in the embodiment in FIG. 13 may be a same relay device, and the function modules in the relay device shown in the embodiment in FIG. 11 and the function modules in the relay device shown in the embodiment in FIG. 13 may be disposed on a same relay device.

Figure 14:
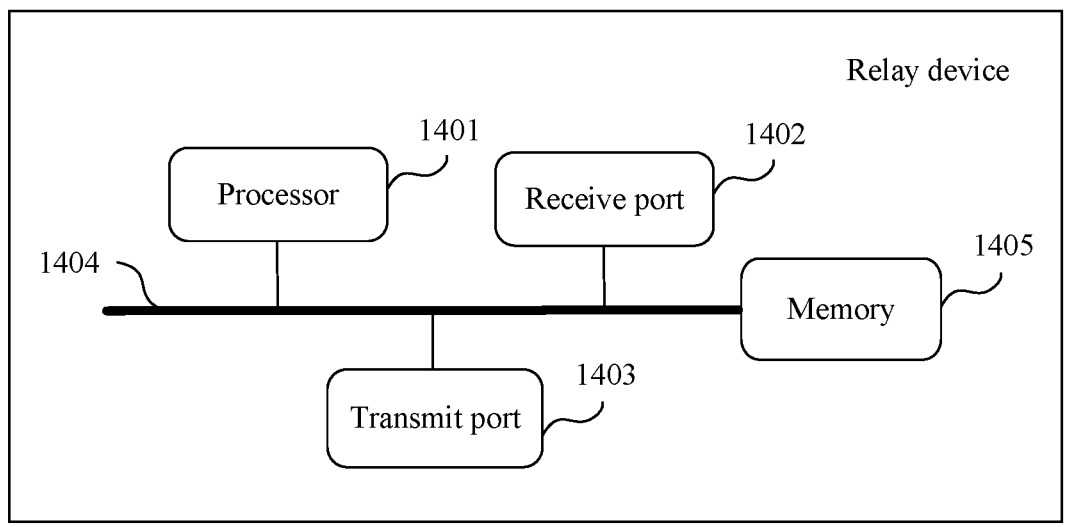
FIG. 14 is a schematic structural diagram of hardware of a relay device according to an embodiment of the present disclosure.

FIG. 14 is a schematic structural diagram 1 of hardware of a relay device according to an embodiment of the present disclosure. Referring to FIG. 14, the relay device includes a processor 1401, a receive port 1402, a transmit port 1403, a communications bus 1404, and a memory 1405. The communications bus 1404 is configured to implement communication and connection between the elements, the memory 1405 may store various programs, and the processor 1401 executes the programs stored in the memory 1405, to complete various processing functions and implement the method steps in the embodiments. Specifically, the processor 1401 receives, by using the receive port 1402, a downlink message sent by a message processor, where the downlink message includes an address of a first ONU and message content.

The processor 1401 obtains, according to the downlink message, an identifier of the first ONU, corresponding to the address of the first ONU.

The processor 1401 sends the message content to the first ONU according to the identifier of the first ONU by using the transmit port 1403.

A first correspondence between an address of an ONU corresponding to an OLT and an identifier of the ONU corresponding to the OLT may be set in the memory 1405, and correspondingly, the processor 1401 may be specifically configured to:

obtain the address of the first ONU from the downlink message; and obtain, according to the first correspondence and the address of the first ONU, the identifier of the first ONU, corresponding to the address of the first ONU.

The relay device shown in this embodiment of the present disclosure may execute the technical solutions shown in the embodiments in FIG. 2 to FIG. 6, and implementation principles and beneficial effects are similar. Details are not described herein again.

Figure 15:
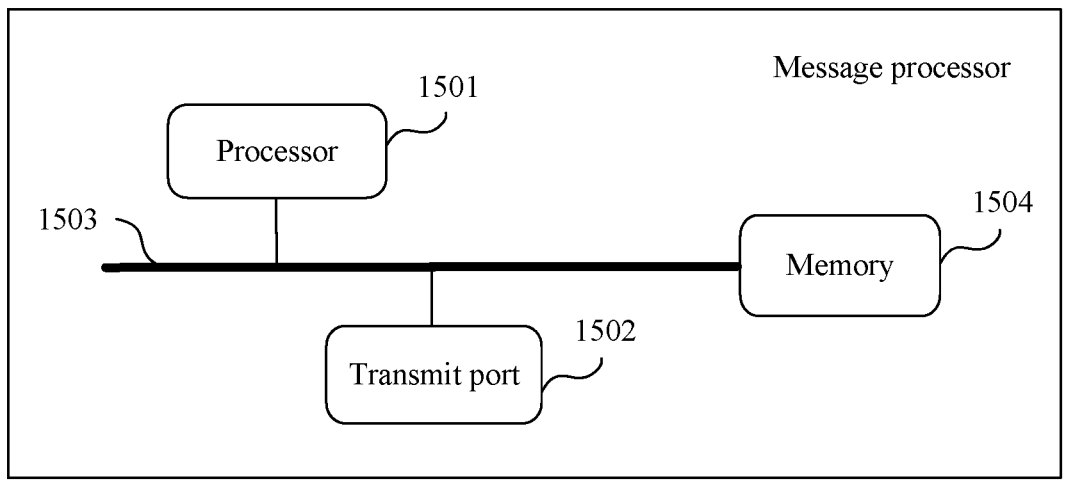
FIG. 15 is a schematic structural diagram of hardware of a message processor according to an embodiment of the present disclosure.

FIG. 15 is a schematic structural diagram of hardware of a message processor according to an embodiment of the present disclosure. Referring to FIG. 15, the message processor includes a processor 1501, a transmit port 1502, a communications bus 1503, and a memory 1504. The communications bus 1503 is configured to implement communication and connection between the elements, the memory 1504 may store various programs, and the processor 1501 executes the programs stored in the memory 1504, to complete various processing functions and implement the method steps in the embodiments. Specifically, the processor 1501 generates or obtains message content.

The processor 1501 obtains an address of a first ONU.

The processor 1501 encapsulates the message content to obtain a downlink message, and sets the address of the first ONU as a destination address of the downlink message, so that the downlink message includes the message content and the address of the first ONU.

The processor 1501 sends the downlink message to a relay device by using the transmit port 1502, so that the relay device obtains an identifier of the first ONU, corresponding to the address of the first ONU, and sends an identifier of an ONU and the message content to the first ONU according to the identifier of the first ONU.

When the address of the first ONU is a MAC address, the processor 1501 may specifically encapsulate the message content into an Ethernet frame, and set the MAC address of the first ONU as a destination MAC address of the Ethernet frame, so that the Ethernet frame includes the message content and the MAC address of the first ONU; or when the address of the first ONU is an IP address, the processor 1501 may specifically encapsulate the message content into an IP data packet, and set the IP address of the first ONU as a destination IP address of the IP data packet, so that the IP data packet includes the message content and the IP address of the first ONU.

The message processor shown in this embodiment of the present disclosure may execute the technical solutions shown in the embodiments in FIG. 2 to FIG. 6, and implementation principles and beneficial effects are similar. Details are not described herein again.

Figure 16:
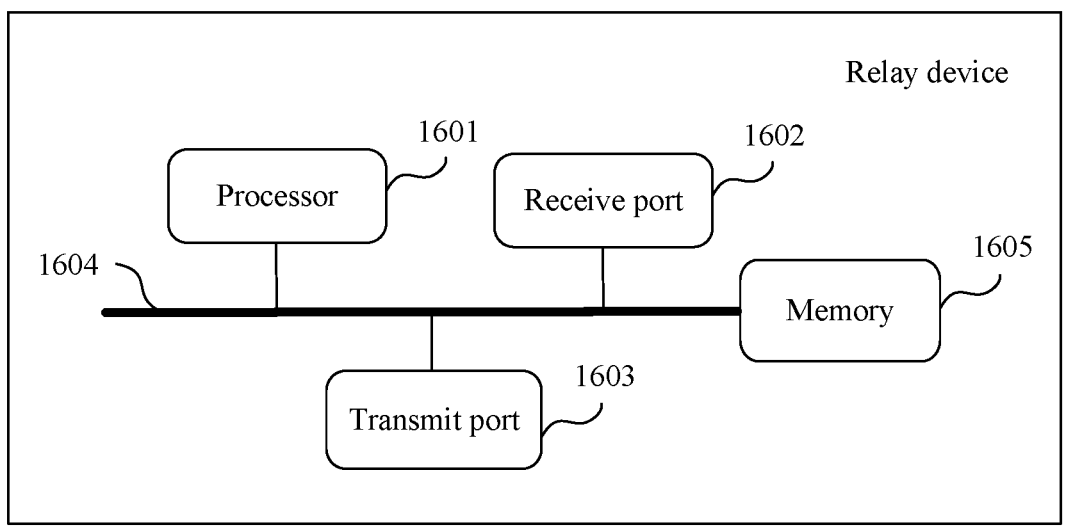
FIG. 16 is a schematic structural diagram of hardware of a relay device according to an embodiment of the present disclosure.

FIG. 16 is a schematic structural diagram 2 of hardware of a relay device according to an embodiment of the present disclosure. Referring to FIG. 16, the relay device includes a processor 1601, a receive port 1602, a transmit port 1603, a communications bus 1604, and a memory 1605. The communications bus 1604 is configured to implement communication and connection between the elements, the memory 1605 may store various programs, and the processor 1601 executes the programs stored in the memory 1605, to complete various processing functions and implement the method steps in the embodiments. Specifically, the processor 1601 receives, by using the receive port 1602, an uplink message sent by a second ONU, where the uplink message includes an identifier of the second ONU and message content.

The processor 1601 obtains, according to the uplink message, an address of the second ONU, corresponding to the identifier of the second ONU.

The processor 1601 sends the address of the second ONU and the message content to a message processor by using the transmit port 1603, so that the message processor processes the message content according to the address of the second ONU and the message content.

A correspondence between an address of an ONU corresponding to an OLT and an identifier of the ONU corresponding to the OLT may be set in the memory 1605, and correspondingly, the processor 1601 may be specifically configured to:

obtain the identifier of the second ONU in the uplink message; and obtain, according to the correspondence and the identifier of the second ONU, the address of the second ONU, corresponding to the identifier of the second ONU.

The relay device shown in this embodiment of the present disclosure may execute the technical solutions shown in the embodiments in FIG. 7 to FIG. 10, and implementation principles and beneficial effects are similar. Details are not described herein again.

The relay device shown in the embodiment in FIG. 14 and the relay device shown in the embodiment FIG. 16 may be a same relay device. The first ONU and the second ONU in this embodiment of the present disclosure may be a same ONU, or may be different ONUs. The relay device and the message processor may execute both the downlink transmission process of a message in the embodiments shown in FIG. 2 to FIG. 6 and the uplink transmission process of a message in the embodiments shown in FIG. 7 to FIG. 10.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A message transmission method, wherein the method comprises:

receiving, by a relay device, a downlink message sent by a message processor, wherein the downlink message comprises message content and an address of an optical network unit (ONU), wherein transmitting the downlink message from the message processor to the relay device comprises transmitting an optical network unit management and control interface (OMCI) downlink message or a management and maintenance (OAM) downlink message in one of an OpenFlow message, a virtual extensible local area network (VXLAN) tunnel, or a multi-protocol level switching (MPLS) tunnel;

obtaining, by the relay device according to the downlink message, an identifier of the ONU, corresponding to the address of the ONU, wherein the identifier of the ONU comprises either a number of the ONU in a gigabit passive optical network (GPON) or a next-generation GPON, or a logic circuit identifier of the ONU in an Ethernet passive optical network (EPON) or a next-generation EPON; and sending, by the relay device, the message content to the ONU according to the identifier of the ONU.

2. The method according to claim 1, wherein the obtaining, by the relay device according to the downlink message, an identifier of the ONU, corresponding to the address of the ONU comprises:

obtaining, by the relay device, the address of the ONU from the downlink message; and obtaining, by the relay device, the identifier of the ONU according to a first correspondence and the address of the ONU, wherein the first correspondence is a correspondence between the address of the ONU and the identifier of the ONU.

3. The method according to claim 1, further comprising:
obtaining, by the relay device, the message content from the downlink message;
obtaining, by the relay device, a passive optical network (PON) frame according to the message content and the identifier of the ONU; and
determining, by the relay device according to a second correspondence and the identifier of the ONU, a target PON port corresponding to the ONU, wherein the second correspondence is between the identifier of the ONU and the target PON port corresponding to the ONU, wherein the sending, by the relay device, the message content to the ONU according to the identifier of the ONU comprises: sending, by the relay device, the PON frame by using the target PON port.

4. The method according to claim 1, wherein
the method is applied to a gigabit passive optical network (GPON) or a next-generation GPON, the message processor is an optical network unit management and control interface (OMCI) message processor, and the message content is the OMCI downlink message; or
the method is applied to an Ethernet passive optical network (EPON) or a next-generation EPON, the message processor is an operation, management and maintenance (OAM) message processor, and the message content is the OAM downlink message.

5. A message transmission method, wherein the method comprises:
obtaining, by a message processor, message content and an address of an optical network unit (ONU);
obtaining, by the message processor, a downlink message according to the message content and the address of the ONU, wherein a destination address of the downlink message is the address of the ONU; and
sending, by the message processor, the downlink message to a relay device, wherein transmitting the downlink message from the message processor to the relay device comprises transmitting an optical network unit management and control interface (OMCI) downlink message or a management and maintenance (OAM) downlink message in one of an OpenFlow message, a virtual extensible local area network (VXLAN) tunnel, or a multi-protocol level switching (MPLS) tunnel,
wherein an identifier of the ONU corresponding to the address of the ONU is obtained at the relay device, and wherein the identifier of the ONU comprises either a number of the ONU in a gigabit passive optical network (GPON) or a next-generation GPON, or a logic circuit identifier of the ONU in an Ethernet passive optical network (EPON) or a next-generation EPON.

6. The method according to claim 5, wherein the address of the ONU is a Media Access Control (MAC) address of the ONU, and the obtaining, by the message processor, a downlink message according to the message content and the address of the ONU comprises:
obtaining, by the message processor, an Ethernet frame according to the message content and the MAC address of the ONU, wherein the Ethernet frame comprises the message content and the MAC address of the ONU, and a destination MAC address of the Ethernet frame is the MAC address of the ONU.

7. The method according to claim 5, wherein the address of the ONU is an Internet Protocol (IP) address of the ONU, and the obtaining, by the message processor, a downlink message according to the message content and the address of the ONU comprises:
obtaining, by the message processor, an IP data packet according to the message content and the IP address of the ONU, wherein the IP data packet comprises the message content and the IP address of the ONU, and a destination IP address of the IP data packet is the IP address of the ONU.

8. A message transmission method, wherein the method comprises:
receiving, by a relay device, an uplink message sent by an optical network unit (ONU), wherein the uplink message comprises message content and an identifier of the ONU, wherein the identifier of the ONU comprises either a number of the ONU in a gigabit passive optical network (GPON) or a next-generation GPON, or a logic circuit identifier of the ONU in an Ethernet passive optical network (EPON) or a next-generation EPON;
obtaining, by the relay device according to the uplink message, an address of the ONU, corresponding to the identifier of the ONU; and
sending, by the relay device, the address of the ONU and the message content to a message processor, wherein transmitting the message content from the relay device to the message processor comprises transmitting an optical network unit management and control interface (OMCI) uplink message or a management and maintenance (OAM) uplink message in one of an OpenFlow message, a virtual extensible local area network (VXLAN) tunnel, or a multi-protocol label switching (MPLS) tunnel.

9. The method according to claim 8, wherein the obtaining, by the relay device according to the uplink message, an address of the ONU, corresponding to the identifier of the ONU comprises:
obtaining, by the relay device, the identifier of the ONU in the uplink message; and
obtaining, by the relay device, the address of the ONU according to a correspondence and the identifier of the ONU, wherein the correspondence is a correspondence between the identifier of the ONU and the address of the ONU.

10. The method according to claim 8, wherein the address of the ONU is a Media Access Control (MAC) address of the ONU, and the method further comprises:
obtaining, by the relay device, the message content from the uplink message; and
obtaining, by the relay device, an Ethernet frame according to the message content and the MAC address of the ONU, wherein the Ethernet frame comprises the message content and the MAC address of the ONU, and a MAC address of the Ethernet frame is the MAC address of the ONU.

11. The method according to claim 8, wherein the address of the ONU is an Internet Protocol (IP) address of the ONU, and the method further comprises:
obtaining, by the relay device, the message content from the uplink message; and
obtaining, by the relay device, an IP data packet according to the message content and the IP address of the ONU, wherein the IP data packet comprises the message content and the IP address of the ONU, and an IP address of the IP data packet is the IP address of the ONU.

12. A relay device, comprising:
a memory; and
a processor coupled to the memory, the processor configured to:

receive a downlink message sent by a message processor, wherein the downlink message comprises an address of an optical network unit (ONU) and message content, wherein transmitting the downlink message from the message processor to the relay device comprises transmitting an optical network unit management and control interface (OMCI) downlink message or a management and maintenance (OAM) downlink message in one of an OpenFlow message, a virtual extensible local area network (VXLAN) tunnel, or a multi-protocol label switching (MPLS) tunnel, obtain, according to the downlink message, an identifier of the ONU, corresponding to the address of the ONU, wherein the identifier of the ONU comprises either a number of the ONU in a gigabit passive optical network (GPON) or a next-generation GPON, or a logic circuit identifier of the ONU in an Ethernet passive optical network (EPON) or a next-generation EPON, and send the message content to the ONU according to the identifier of the ONU.

13. The relay device according to claim 12, wherein the processor is further configured to:

obtain the address of the ONU from the downlink message, and obtain the identifier of the ONU according to a first correspondence and the address of the ONU, wherein the first correspondence is a correspondence between the address of the ONU and the identifier of the ONU.

14. The relay device according to claim 12, wherein the processor is further configured to:

obtain the message content from the downlink message, obtain a passive optical network (PON) frame according to the message content and the identifier of the ONU, determine, according to a second correspondence and the identifier of the ONU, a target PON port corresponding to the ONU, wherein the second correspondence is between the identifier of the ONU and the target PON port corresponding to the ONU, and send the PON frame by using the target PON port.

15. A relay device, comprising:

a memory; and a processor coupled to the memory, the processor configured to:

receive an uplink message sent by an optical network unit (ONU), wherein the uplink message comprises message content and an identifier of the ONU, wherein the identifier of the ONU comprises either a number of the ONU in a gigabit passive optical network (GPON) or a next-generation GPON, or a logic circuit identifier of the ONU in an Ethernet passive optical network (EPON) or a next-generation EPON, obtain, according to the uplink message, an address of the ONU, corresponding to the identifier of the ONU, and send the address of the ONU and the message content to a message processor, wherein transmitting the message content from the relay device to the message processor comprises transmitting an optical network unit management and control interface (OMCI) uplink message or a management and maintenance (OAM) uplink message in one of an OpenFlow message, a virtual extensible local area network (VXLAN) tunnel, or a multi-protocol label switching (MPLS) tunnel.

16. The relay device according to claim 15, wherein the processor is further configured to:

obtain the identifier of the ONU in the uplink message, and obtain the address of the ONU according to a correspondence and the identifier of the ONU, wherein the correspondence is a correspondence between the identifier of the ONU and the address of the ONU.

17. The relay device according to claim 15, wherein the address of the ONU is a Media Access Control (MAC) address of the ONU, and the processor is further configured to:

obtain the message content from the uplink message, and obtain the Ethernet frame according to the message content and the MAC address of the ONU, wherein the Ethernet frame comprises the message content and the MAC address of the ONU, and a MAC address of the Ethernet frame is the MAC address of the ONU.

18. The relay device according to claim 15, wherein the address of the ONU is an Internet Protocol IP address of the ONU, and the processor is further configured to:

obtain the message content from the uplink message, and obtain the IP data packet according to the message content and the IP address of the ONU, wherein the IP data packet comprises the message content and the IP address of the ONU, and an IP address of the IP data packet is the IP address of the ONU.

* * * * *

UNITED STATES PATENT AND TRADEMARK OFFICE
CERTIFICATE OF CORRECTION

PATENT NO. : 10,827,239 B2  
APPLICATION NO. : 16/132296  
DATED : November 3, 2020  
INVENTOR(S) : Ruobin Zheng Page 1 of 1

It is certified that error appears in the above-identified patent and that said Letters Patent is hereby corrected as shown below:

In the Claims

In Claim 1, Column 28, Line 46, delete "multi-protocol level switching" and insert --multi-protocol label switching--.

In Claim 5, Column 29, Line 44, delete "multi-protocol level switching" and insert --multi-protocol label switching--.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*